United States Patent
Dhawan et al.

(10) Patent No.: US 11,641,420 B2
(45) Date of Patent: May 2, 2023

(54) SYSTEM AND METHOD FOR PLACING TELEPHONE CALLS USING A DISTRIBUTED VOICE APPLICATION EXECUTION SYSTEM ARCHITECTURE

(71) Applicant: XTONE, INC., McLean, VA (US)

(72) Inventors: Vishal Dhawan, Centreville, VA (US); Timothy M Price, Rockville, MD (US); Manoj Sindhwani, Oak Hill, VA (US)

(73) Assignee: Xtone, Inc., McLean, VA (US)

(*) Notice: Subject to any disclaimer, the term of this patent is extended or adjusted under 35 U.S.C. 154(b) by 0 days.

(21) Appl. No.: 17/582,479

(22) Filed: Jan. 24, 2022

(65) Prior Publication Data

US 2022/0247863 A1    Aug. 4, 2022

Related U.S. Application Data

(63) Continuation of application No. 16/773,444, filed on Jan. 27, 2020, now Pat. No. 11,233,902, which is a continuation of application No. 13/595,482, filed on Aug. 27, 2012, now Pat. No. 10,547,745, which is a continuation of application No. 12/717,826, filed on Mar. 4, 2010, now abandoned, which is a continuation-in-part of application No. 11/514,116, filed on Sep. 1, 2006, now abandoned.

(60) Provisional application No. 61/157,282, filed on Mar. 4, 2009, provisional application No. 60/712,808, filed on Sep. 1, 2005.

(51) Int. Cl.
*H04M 3/51* (2006.01)

(52) U.S. Cl.
CPC ...... *H04M 3/5158* (2013.01); *H04M 2250/74* (2013.01)

(58) Field of Classification Search
USPC .......................................................... 379/361
See application file for complete search history.

(56) References Cited

U.S. PATENT DOCUMENTS

| 5,073,923 A | 12/1991 | Offers et al. |
| 5,074,923 A | 12/1991 | Offers et al. |
| 5,323,444 A | 6/1994 | Ertz et al. |
| 5,802,526 A * | 9/1998 | Fawcett ............... H04M 3/493 |
| | | 707/916 |

(Continued)

FOREIGN PATENT DOCUMENTS

| GB | 2362540 | 11/2001 |
| WO | 96/20448 | 7/1996 |
| WO | WO 01/45086 | 6/2001 |

OTHER PUBLICATIONS

Office Action dated Nov. 28, 2011 in U.S. Appl. No. 12/717,826.

(Continued)

*Primary Examiner* — Amal S Zenati
(74) *Attorney, Agent, or Firm* — FisherBroyles, LLP

(57) ABSTRACT

A system and method for causing a voice application to be performed on one or more user local devices utilizes a distributed voice application execution system architecture. The distributed voice application execution system architecture allows a voice applications agent on a user's local device to obtain a rendered voice application from a remote voice application rendering agent. The voice applications agent on the user's local device can then perform the voice application for the user.

44 Claims, 7 Drawing Sheets

(56) References Cited

U.S. PATENT DOCUMENTS

| | | | |
|---|---|---|---|
| 5,918,014 | A | 6/1999 | Robinson |
| 6,035,018 | A | 3/2000 | Kaufman |
| 6,072,482 | A | 6/2000 | Moon et al. |
| 6,088,428 | A | 7/2000 | Trandal et al. |
| 6,212,408 | B1 | 4/2001 | Son et al. |
| 6,285,984 | B1 | 9/2001 | Speicher |
| 6,334,103 | B1 | 12/2001 | Surace et al. |
| 6,408,272 | B1 | 6/2002 | White et al. |
| 6,636,504 | B1 | 10/2003 | Albers et al. |
| 6,636,831 | B1 | 10/2003 | Profit, Jr. et al. |
| 6,738,743 | B2 | 5/2004 | Sharma et al. |
| 6,744,881 | B1 | 6/2004 | Price |
| 6,757,781 | B2 | 6/2004 | Williams et al. |
| 6,829,334 | B1 | 12/2004 | Zirngibl et al. |
| 6,882,974 | B2 | 4/2005 | James et al. |
| 6,901,431 | B1 | 5/2005 | Dodrill et al. |
| 6,977,992 | B2 | 12/2005 | Zirngibl et al. |
| 6,988,070 | B2 | 1/2006 | Kawasaki et al. |
| 7,016,847 | B1 | 3/2006 | Tessel et al. |
| 7,020,609 | B2 | 3/2006 | Thrift et al. |
| 7,024,363 | B1 | 4/2006 | Comerford et al. |
| 7,043,232 | B2 | 5/2006 | Pelaez et al. |
| 7,062,709 | B2 | 6/2006 | Cheung |
| 7,069,221 | B2 | 6/2006 | Crane et al. |
| 7,174,005 | B1 | 2/2007 | Rodkey et al. |
| 7,174,297 | B2 | 2/2007 | Guerra et al. |
| 7,263,712 | B2 | 8/2007 | Spencer |
| 7,334,050 | B2 | 2/2008 | Zondervan et al. |
| 7,376,222 | B2 | 5/2008 | Lin |
| 7,466,810 | B1* | 12/2008 | Quon ............. H04M 3/42229 709/201 |
| 7,483,833 | B2 | 1/2009 | Peters |
| 7,552,055 | B2 | 6/2009 | Lecoeuche |
| 7,599,838 | B2 | 10/2009 | Gong et al. |
| 7,657,005 | B2 | 2/2010 | Chang |
| 7,689,426 | B2 | 3/2010 | Matula |
| 7,702,084 | B2 | 4/2010 | Wolmuth |
| 7,801,283 | B2 | 9/2010 | Harwood et al. |
| 7,801,306 | B2 | 9/2010 | Reitmeier et al. |
| 7,809,376 | B2* | 10/2010 | Letourneau ......... H04M 3/4938 455/418 |
| 7,844,215 | B2* | 11/2010 | Vance ................. H04M 3/4938 455/3.06 |
| 7,885,817 | B2 | 2/2011 | Paek et al. |
| 7,889,853 | B2 | 2/2011 | Sutcliffe |
| 7,948,892 | B2 | 5/2011 | Morinaga et al. |
| 8,064,588 | B2 | 11/2011 | Brahm et al. |
| 8,085,909 | B2* | 12/2011 | Tischer ............... G06F 16/9027 379/88.23 |
| 8,140,340 | B2 | 3/2012 | Bhogal et al. |
| 8,223,931 | B1 | 7/2012 | Lavian et al. |
| 8,483,853 | B1 | 7/2013 | Lambourne |
| 2002/0001370 | A1 | 1/2002 | Walker et al. |
| 2002/0022453 | A1 | 2/2002 | Balog et al. |
| 2002/0059073 | A1 | 5/2002 | Zondervan et al. |
| 2002/0065944 | A1 | 5/2002 | Hickey et al. |
| 2002/0073034 | A1 | 6/2002 | Wagner et al. |
| 2002/0108125 | A1 | 8/2002 | Joao |
| 2002/0161646 | A1 | 10/2002 | Gailey et al. |
| 2002/0169604 | A1 | 11/2002 | Damiba et al. |
| 2002/0169615 | A1 | 11/2002 | Kruger et al. |
| 2002/0188451 | A1 | 12/2002 | Guerra et al. |
| 2003/0007609 | A1 | 1/2003 | Yuen et al. |
| 2003/0068999 | A1 | 4/2003 | Casali et al. |
| 2003/0114202 | A1 | 6/2003 | Suh et al. |
| 2003/0119487 | A1 | 6/2003 | Silvester |
| 2003/0125944 | A1 | 7/2003 | Wohlsen et al. |
| 2003/0144005 | A1 | 7/2003 | Videtich |
| 2003/0191816 | A1 | 10/2003 | Landress et al. |
| 2003/0233238 | A1 | 12/2003 | Creamer et al. |
| 2004/0006471 | A1 | 1/2004 | Chiu |
| 2004/0006476 | A1 | 1/2004 | Chiu |
| 2004/0010412 | A1 | 1/2004 | Chiu |
| 2004/0151285 | A1 | 3/2004 | Sychta |
| 2004/0068364 | A1 | 4/2004 | Zhao et al. |
| 2004/0093218 | A1 | 5/2004 | Bezar |
| 2004/0163073 | A1 | 8/2004 | Krzyzanowski et al. |
| 2004/0174983 | A1 | 9/2004 | Olschwang et al. |
| 2004/0210637 | A1 | 10/2004 | Loveland |
| 2004/0230689 | A1 | 11/2004 | Loveland |
| 2005/0091057 | A1 | 4/2005 | Phillips et al. |
| 2005/0135338 | A1 | 6/2005 | Chiu et al. |
| 2005/0141679 | A1 | 6/2005 | Zirngibl et al. |
| 2005/0163136 | A1 | 7/2005 | Chiu et al. |
| 2005/0234720 | A1 | 10/2005 | Paillet et al. |
| 2005/0234727 | A1 | 10/2005 | Chiu |
| 2005/0283367 | A1 | 12/2005 | Ativanichayaphong et al. |
| 2006/0047511 | A1 | 3/2006 | Hussain |
| 2006/0069701 | A1 | 3/2006 | O'Rourke, III |
| 2006/0122840 | A1 | 6/2006 | Anderson et al. |
| 2006/0159246 | A1 | 7/2006 | Abramson et al. |
| 2006/0182247 | A1 | 8/2006 | Batni et al. |
| 2006/0206340 | A1 | 9/2006 | Silvera et al. |
| 2006/0293897 | A1 | 12/2006 | White et al. |
| 2007/0078706 | A1 | 4/2007 | Datta et al. |
| 2007/0135101 | A1 | 6/2007 | Ramati et al. |
| 2007/0143113 | A1 | 6/2007 | Nanavati et al. |
| 2007/0156747 | A1* | 7/2007 | Samuelson ............ G06F 16/954 707/999.102 |
| 2007/0206758 | A1 | 9/2007 | Barak |
| 2007/0263838 | A1 | 11/2007 | Wiseman et al. |
| 2007/0283268 | A1 | 12/2007 | Berger |
| 2008/0104630 | A1 | 5/2008 | Bruce et al. |
| 2008/0165937 | A1 | 7/2008 | Moore |
| 2009/0007171 | A1 | 1/2009 | Casey et al. |
| 2009/0022283 | A1 | 1/2009 | Pollitt |
| 2010/0036717 | A1 | 2/2010 | Trest |
| 2010/0054432 | A1* | 3/2010 | Brahm .................. H04M 7/006 379/88.19 |
| 2010/0086107 | A1 | 4/2010 | Tzruya |
| 2013/0045778 | A1 | 2/2013 | Sundaresan et al. |

OTHER PUBLICATIONS

Office Action dated Sep. 9, 2014 in U.S. Appl. No. 13/595,482.
Office Action dated Jul. 8, 2015 in U.S. Appl. No. 13/595,482.
Office Action dated Mar. 10, 2016 in U.S. Appl. No. 13/595,482.
Office Action dated Jan. 5, 2017 in U.S. Appl. No. 13/595,482.
Office Action dated Oct. 10, 2017 in U.S. Appl. No. 13/595,482.
Office Action dated Jun. 29, 2018 in U.S. Appl. No. 13/595,482.
Office Action dated May 29, 2020 in U.S. Appl. No. 16/773,444.
Office Action dated Mar. 3, 2021 in U.S. Appl. No. 16/773,444.
Office Action dated Sep. 15, 2021 in U.S. Appl. No. 16/773,444.
U.S. Appl. No. 11/514,116, filed Sep. 1, 2006.
Office Action for U.S. Appl. No. 11/514,116 dated Feb. 26, 2010.
U.S. Appl. No. 12/717,826, filed Mar. 4, 2010.
Office Action for U.S. Appl. No. 12/717,826 dated Nov. 28, 2011.
U.S. Appl. No. 12/717,839, filed Mar. 4, 2010.
Office Action for U.S. Appl. No. 12/717,839 dated Dec. 29, 2011.
Office Action for U.S. Appl. No. 12/717,839 dated Sep. 21, 2012.
Office Action for U.S. Appl. No. 12/717,839 dated May 2, 2014.
Office Action for U.S. Appl. No. 12/717,839 dated Mar. 17, 2015.
Office Action for U.S. Appl. No. 12/717,839 dated Nov. 20, 2015.
U.S. Appl. No. 12/717,854, filed Mar. 4, 2010.
Office Action for U.S. Appl. No. 12/717,854 dated Dec. 29, 2011.
Office Action for U.S. Appl. No. 12/717,854 dated Oct. 16, 2012.
Office Action for U.S. Appl. No. 12/717,854 dated Feb. 3, 2015.
Office Action for U.S. Appl. No. 12/717,854 dated Jan. 4, 2016.
U.S. Appl. No. 12/717,858, filed Mar. 4, 2010.
Office Action for U.S. Appl. No. 12/717,858 dated Nov. 25, 2011.
Office Action for U.S. Appl. No. 12/717,858 dated Sep. 27, 2012.
Office Action for U.S. Appl. No. 12/717,858 dated Mar. 27, 2015.
Office Action for U.S. Appl. No. 12/717,858 dated Apr. 22, 2016.
U.S. Appl. No. 12/717,865, filed Mar. 4, 2010.
Office Action for U.S. Appl. No. 12/717,865 dated Mar. 13, 2012.
Office Action for U.S. Appl. No. 12/717,865 dated Aug. 15, 2013.
Office Action for U.S. Appl. No. 12/717,865 dated Apr. 10, 2015.
Office Action for U.S. Appl. No. 12/717,865 dated May 9, 2017.
Office Action for U.S. Appl. No. 12/717,865 dated Jun. 21, 2021.
U.S. Appl. No. 12/717,875, filed Mar. 4, 2010.

(56) References Cited

OTHER PUBLICATIONS

Office Action for U.S. Appl. No. 12/717,875 dated Dec. 29, 2011.
Office Action for U.S. Appl. No. 12/717,875 dated Nov. 26, 2012.
Office Action for U.S. Appl. No. 12/717,875 dated May 5, 2015.
Office Action for U.S. Appl. No. 12/717,875 dated Jan. 4, 2016.
Office Action for U.S. Appl. No. 12/717,875 dated Jun. 27, 2017.
U.S. Appl. No. 12/717,881, filed Mar. 4, 2010.
Office Action for U.S. Appl. No. 12/717,881 dated Nov. 22, 2011.
Office Action for U.S. Appl. No. 12/717,881 dated Aug. 15, 2013.
U.S. Appl. No. 12/717,888, filed Mar. 4, 2010.
Office Action for U.S. Appl. No. 12/717,888 dated Jan. 25, 2012.
Office Action for U.S. Appl. No. 12/717,888 dated Sep. 27, 2012.
Office Action for U.S. Appl. No. 12/717,888 dated Apr. 1, 2015.
Office Action for U.S. Appl. No. 12/717,888 dated Jun. 3, 2016.
U.S. Appl. No. 12/717,893, filed Mar. 4, 2010.
Office Action for U.S. Appl. No. 12/717,893 dated Mar. 1, 2012.
Office Action for U.S. Appl. No. 12/717,893 dated Sep. 27, 2012.
Office Action for U.S. Appl. No. 12/717,893 dated Oct. 15, 2013.
Office Action for U.S. Appl. No. 12/717,893 dated Aug. 1, 2014.
Office Action for U.S. Appl. No. 12/717,893 dated Apr. 9, 2015.
Office Action for U.S. Appl. No. 12/717,893 dated Apr. 26, 2021.
U.S. Appl. No. 12/717,897, filed Mar. 4, 2010.
Office Action for U.S. Appl. No. 12/717,897 dated Feb. 3, 2012.
Office Action for U.S. Appl. No. 12/717,897 dated Sep. 21, 2012.
Office Action for U.S. Appl. No. 12/717,897 dated Jul. 19, 2013.
Office Action for U.S. Appl. No. 12/717,897 dated Dec. 9, 2014.
U.S. Appl. No. 12/943,510, filed Jul. 10, 2010.
Office Action for U.S. Appl. No. 12/943,510 dated Apr. 10, 2012.
Office Action for U.S. Appl. No. 12/943,510 dated Nov. 21, 2012.
U.S. Appl. No. 13/355,840, filed Jan. 23, 2012.
Office Action for U.S. Appl. No. 13/355,840 dated Apr. 5, 2012.
U.S. Appl. No. 13/595,482, filed Aug. 27, 2012.
Office Action for U.S. Appl. No. 13/595,482 dated Sep. 9, 2014.
Office Action for U.S. Appl. No. 13/595,482 dated Jul. 8, 2015.
Office Action for U.S. Appl. No. 13/595,482 dated Mar. 10, 2016.
Office Action for U.S. Appl. No. 13/595,482 dated Jan. 5, 2017.
Office Action for U.S. Appl. No. 13/595,482 dated Oct. 10, 2017.
Office Action for U.S. Appl. No. 13/595,482 dated Sep. 20, 2019.
U.S. Appl. No. 15/216,752, filed Jul. 22, 2016.
Office Action for U.S. Appl. No. 15/216,752 dated Mar. 24, 2017.
Office Action for U.S. Appl. No. 15/216,752 dated Jan. 12, 2018.
Office Action for U.S. Appl. No. 15/216,752 dated Aug. 29, 2018.
U.S. Appl. No. 15/246,770, filed Aug. 25, 2016.
Office Action for U.S. Appl. No. 15/246,770 dated Jan. 26, 2018.
U.S. Appl. No. 15/784,423, filed Oct. 16, 2017.
Office Action for U.S. Appl. No. 15/784,423 dated Nov. 16, 2018.
Office Action for U.S. Appl. No. 15/784,423 dated Aug. 22, 2019.
U.S. Appl. No. 15/982,701, filed May 17, 2018.
Office Action for U.S. Appl. No. 15/982,701 dated Mar. 19, 2019.
U.S. Appl. No. 16/773,444, filed Jan. 27, 2020.
Office Action for U.S. Appl. No. 16/773,444 dated May 29, 2020.
Office Action for U.S. Appl. No. 16/773,444 dated Mar. 3, 2021.
Office Action for U.S. Appl. No. 16/773,444 dated Sep. 15, 2021.
U.S. Appl. No. 16/799,033, filed Feb. 24, 2020.
Office Action for U.S. Appl. No. 16/799,033 dated Mar. 2, 2021.
Office Action for U.S. Appl. No. 16/799,033 dated Sep. 15, 2021.
U.S. Appl. No. 17/410,683, filed Aug. 24, 2021.
Office Action for U.S. Appl. No. 17/410,583 dated Aug. 17, 2022.
U.S. Application No. 17/582,479, filed Jan. 24, 2022.
Office Action for U.S. Appl. No. 17/582,479 dated Sep. 27, 2022.
U.S. Appl. No. 17/582,555, filed Jan. 24, 2022.
Office Action for U.S. Appl. No. 17/582,555 dated Sep. 26, 2022.
Office Action issued for U.S. Appl. No. 17/582,555 dated Mar. 16, 2023.

* cited by examiner

SYSTEM AND METHOD FOR PLACING TELEPHONE CALLS USING A DISTRIBUTED VOICE APPLICATION EXECUTION SYSTEM ARCHITECTURE

This application is a Continuation of application Ser. No. 16/773,444, filed Jan. 27, 2020, which is a Continuation of U.S. application Ser. No. 13/595,482, which was filed on Aug. 27, 2012, now U.S. Pat. No. 10,547,745, which is a Continuation of U.S. application Ser. No. 12/717,826, filed Mar. 4, 2010, now abandoned, which claims priority from U.S. Provisional Application No. 61/157,282, filed Mar. 4, 2009, now expired, and which is a Continuation-in-part of U.S. application Ser. No. 11/514,116, filed Sep. 1, 2006, now abandoned, which claims priority from Provisional Application No. 60/712,808, filed Sep. 1, 2005, now expired.The content of all these applications is hereby incorporated herein by reference.

FIELD OF THE INVENTION

The invention relates to systems and methods for placing a telephone call using information displayed on a computer display screen.

BACKGROUND OF THE INVENTION

A traditional architecture which includes telephony devices and computers is illustrated in FIG. 1. In this traditional architecture, first and second user computers 10, 50 are connected to the Internet 40. First and second user telephones 20, 60 would be connected to the Public Switched Telephone Network (PSTN) 30. Any telephone conversations conducted by the users would initially pass through the PSTN. The operators of the PSTN might route calls through the Internet, but the interface to the actual user telephones would still pass thought the PSTN.

Telemarketers and others who must rapidly place a series of telephone calls have used software which enables a user to place telephone calls using telephone numbers appearing in lists on their computers. Typically, the user would have a list of telephone numbers that appear on the user's computer screen. The user would highlight or select one of the telephone numbers to place a telephone call to the selected number.

In the context of a telemarketer, the user telephone could take the form of a device or expansion card which is installed in the user's computer. One or more separate telephone lines (each having a different telephone number) would be connected to the device, and a headset with a microphone and a speaker element would also be connected to the device. Software running on the user's computer is then used to cause the device to place telephone calls to selected telephone numbers over the telephone lines connected to the device. When a call is connected, the user would be able to talk and hear the call using the headset.

In some embodiments, the computer and the associated calling software are capable of communicating directly with the PSTN, either through a telephone line or via an Internet connection, so the software can instruct the PSTN to place telephone calls.

A method of rapidly placing calls using the architecture illustrated in FIG. 1 would start when User 1 highlights and selects a telephone number assigned to User 2's telephone 60. In some embodiments, the software running on User 1's computer 10 would send signals to the PSTN 30 (either directly or via the Internet) to instruct the PSTN to place a first telephone call to User 1's telephone device 20 over a first telephone line 22, and to place a second call to User 2's telephone 60 over telephone line 62. The signals sent from User 1's computer would also instruct the PSTN to bridge the first and second calls. User 1's telephone would then ring, and User 1 would pick up immediately. User 1 would then hear the call being connected to User 2's telephone 60. If User 2 answers the telephone call, User 1 could begin talking. In other embodiments, the software running on User 1's computer would cause User 1's telephone device to directly call User 2's telephone.

When the call is finished, both User 1 and User 2 would hang up, and User 1 could then highlight and select the next telephone number on his list and the process would be repeated.

In the system described above, when calls are being bridged by the PSTN to connect User 1 and User 2, it is necessary for two telephone calls to be placed over two lines, and for the PSTN to bridge the two calls. Placing two calls and bridging the calls in this fashion is considerably more expensive than simply placing a single telephone call from User 1's telephone device 20 to User 2's telephone 60. However, the increased cost is worthwhile because it enables User 1 to rapidly and accurately place calls to multiple telephone numbers stored on an electronic list.

Also, if User 2 does not answer the call, but an answering machine or answering service does answer the call, User 1 could leave a message. Alternatively, the software running on User 1's computer might be capable of causing a prerecorded message to be recorded on User 2's answering service while User 1 moves on to another call.

To accomplish this, the software would make User 1's computer play the audio message over the first line 22 connected to User 2's telephone 60. The software would also switch User 1's headset or audio interface over to a second line 24. The software would then place a call to User 3. As explained above, this could be accomplished by instructing the PSTN to place a third call to User 1's telephone device 20 over the second line 24, and to place a fourth call to User 3's telephone 70 over line 72. The PSTN would then bridge the third and fourth calls. Or, the software could cause User 1's telephone 20 to directly dial User 3's telephone 70.

When calls are being bridged by the PSTN to connect User 1 with other parties, and User 1 moves on to a new call four telephone lines would be in use simultaneously. The first and second lines 22 and 62 would be used to cause the audio message to be played to User 2's answering service while the third and fourth lines 24 and 72 would be used to allow User 1 to place a call to User 3's telephone. While this enables User 1 to make the next call without wasting time leaving a message for User 2, it means that four lines will be in use, and that two bridges must be maintained. Here again, this involves considerable expense. But the time savings for User 1 make the expense worthwhile.

The description provided above explains one known system for allowing a user to place telephone calls using existing computer and telephone systems. In addition, there are various existing computer and telephony systems that provide voice services to users. These voice services can be speech recognition and touchtone enabled. Examples of such services include voice mail, voice activated dialing, customer care services, and the provision of access to Internet content via telephone.

One common example of a system that provides voice services is an Interactive Voice Response (IVR) system. In prior art systems, a user would typically use a telephone to call in to a central computer system which provides voice services via an IVR system. The IVR system deployed on the central computer system would then launch voice services, for instance by playing an audio clip containing a menu of choices to the user via the telephone line connection. The user could then make a selection by speaking a response. The spoken response would be received at the central computer system via the telephone line connection, and the central computer system would interpret the spoken response using speech recognition techniques. Based on the user's response, the IVR system would then continue to perform application logic to take further action. The further action could involve playing another menu of choices to the user over the telephone line, obtaining and playing information to the user, connecting the user to a third party or a live operator, or any of a wide range of other actions.

The ability to provide voice services has been quite limited by the nature of the systems that provide such services. In the known systems that provide voice services using relatively complex speech recognition processing, the voice applications are performed on high end computing devices located at a central location. Voice Application processing requires a high end centralized computer system because these systems are provisioned to support many simultaneous users.

Because complex voice application processing must be provided using a high end computer system at a central location, and because users are almost never co-located with the high end computer system, a user is almost always connected to the central computer system via a telephone call. The call could be made using a typical telephone or cell phone over the PSTN, or the call might be placed via a VoIP-type (Skype, SIP) connection. Regardless, the user must establish a dedicated, persistent voice connection to the central computer system to access the voice services.

The prior art centralized voice services platforms, which depend on a telephony infrastructure for connection to users, are highly inflexible from a deployment standpoint. The configurations of hardware and software are all concentrated on a small number of high end servers. These configurations are technically complex and hard to monitor, manage, and change as business conditions dictate. Furthermore, the deployment of existing IVR system architectures, and the subsequent provisioning of users and voice applications to them, requires extensive configuration management that is often performed manually. Also, changes in the configuration or deployment of IVR services within extant IVR architectures often require a full or partial suspension of service during any reconfiguration or deployment effort.

Further, cost structures and provisioning algorithms that provision the capabilities of such a centralized voice services platform make it virtually impossible to ensure that a caller can always access the system when the system is under heavy usage. If the system were configured with such a large number of telephone line ports that all potential callers would always be connected to access contrasting types of voice services, with different and overlapping peak utilization hours, the cost of maintaining all the hardware and software elements would be prohibitive. Instead, such centralized voice services platforms are configured with a reasonable number of telephone ports that result in a cost-effective operating structure. The operator of the system must accept that callers may sometimes be refused access. Also, system users must accept that they will not receive an "always on" service.

Prior art centralized voice services platforms also tend to be "operator-centric." In other words, multiple different service providers provide call-in voice services platforms, and each service provider usually maintains their own separate platform. Thus, if a user has called in to a first company's voice services platform, he will not likely be able to access the voice services of a second company's platform during the same call. In order to access the second company's voice services platform, the user must terminate his call to the first company, and then place a new call to the second company's platform. Thus, obtaining access to multiple different IVR systems offered by different companies is not convenient.

In addition to the above-described drawbacks of the current architecture, the shared nature of the servers in a centralized voice services platform limits the ability of the system to provide personalized voice applications to individual users. Similarly, the architecture of prior art IVR systems limit personalization even for groups of users. Because of these factors, the prior art systems have limitations on their ability to dynamically account for individual user preferences or dynamically personalize actual voice applications on the fly. This is so because it becomes very hard for a centralized system to correlate the user with their access devices and environment, to thereby optimize a voice application that is tuned specifically for an individual user. Further, most centralized systems simply lack user-specific data.

Prior art voice services platforms also had security issues. In many instances, it was difficult to verify the identity of a caller. If the voice services platform was configured to give the user confidential information, or the ability to transfer or spend money, security becomes an important consideration.

Typically, when a call is received at the voice services platform, the only information the voice services platform has about the call is a caller ID number. Unfortunately, the caller ID number can be falsified. Thus, even that small amount of information could not be used as a reliable means of identifying the caller. For these reasons, callers attempting to access sensitive information or services were usually asked to provide identifying data that could be compared to a database of security information. While this helps, it still does not guarantee that the caller is the intended user, since the identifying data could be provided by anybody.

DETAILED DESCRIPTION OF PREFERRED EMBODIMENTS

Systems, devices and methods embodying the invention are intended to provide users with enhanced abilities to place telephone calls. Systems and methods embodying the invention can also be used to provide users with speech and touch tone enabled Voice Applications for accessing various services. In this respect, the systems, devices and methods embodying the invention serve some of the same functions as the background art systems.

However, unlike the prior art voice services platforms, systems and methods embodying the invention utilize a highly distributed processing architecture to deliver the services. As will be explained below, the underlying architecture and the distributed nature of systems and methods embodying the invention allow the inventive systems to provide the same services as prior art systems, but with better performance, at a significantly reduced cost, and with far fewer limitations. In addition, systems and methods embodying the invention avoid or solve many of the drawbacks of the prior art systems and platforms discussed above. Further, because of the way systems and methods embodying the invention operate, they can provide new and additional services that could never have been provided by prior art systems, such as centralized voice services platforms. Systems and methods embodying the invention also allow for much better personalization of delivered services, and they allow existing services to be upgraded, improved, or further personalized much more easily than was possible with the prior art centralized voice services platforms.

Figure 2:
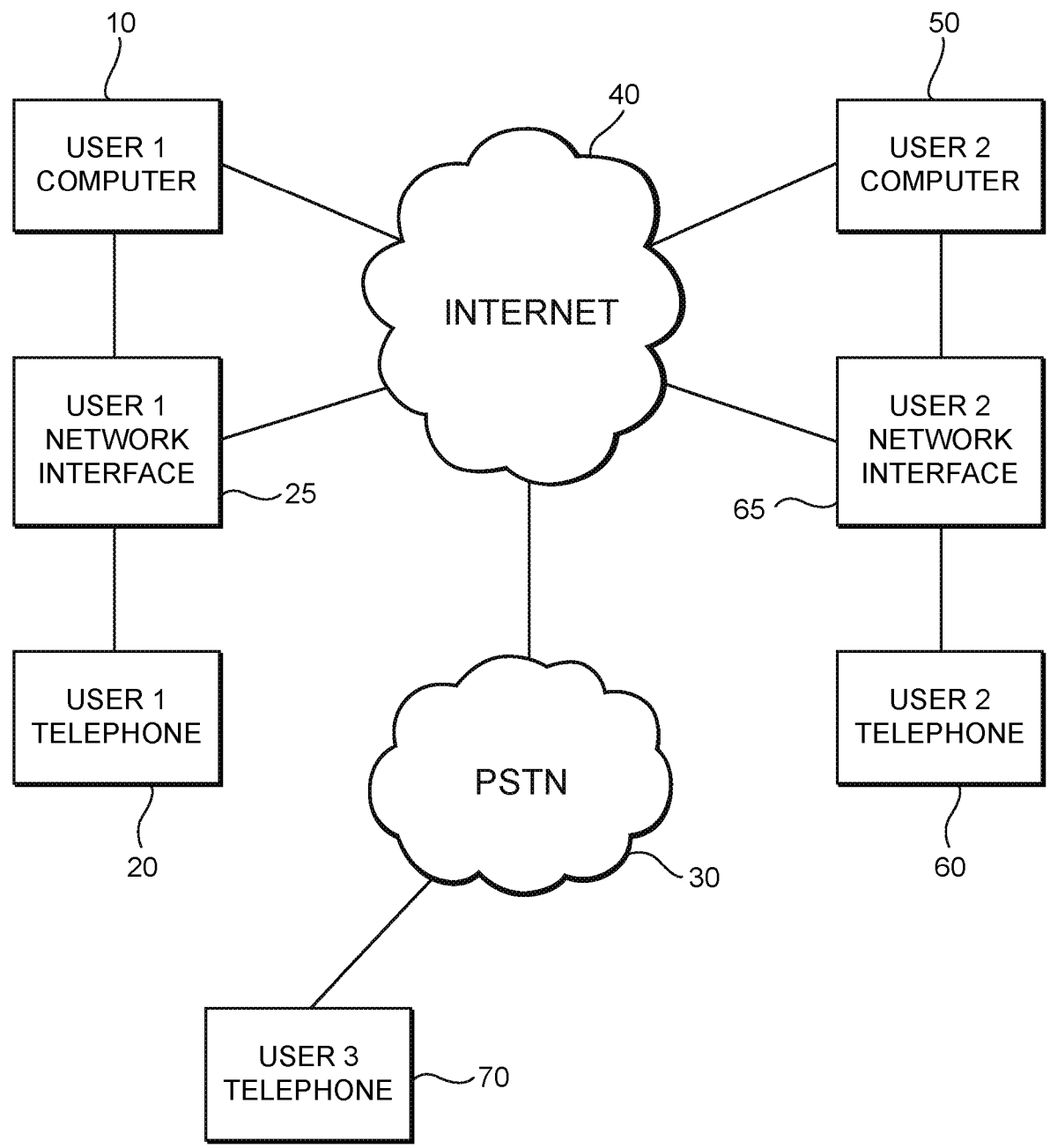
FIG. 2 is a diagram of a basic system architecture embodying the invention.

In recent years, the architecture model for home and office computers and telephones has been slowly evolving towards the architecture illustrated in FIG. 2. In this architecture, user telephones 20, 60 are coupled to network interfaces 25, 65 which are themselves directly coupled to the Internet 40, or at least to a high speed digital data network. The user computers 10 and 50 may still be directly coupled to the Internet 40, or they may share access to the Internet through the network interface devices 25, 65. Of course, some user telephones 70 are still directly coupled to the PSTN 30.

In the new architecture illustrated in FIG. 2, the network interfaces 25, 65 convert analog signals generated by traditional analog telephone devices into digital data streams, and these digital data streams are communicated over the Internet. In implementing a telephone call between two user telephones that are connected to the Internet via network interfaces devices, the entire path traveled between the network interface devices might consist of digital data traffic carried over the Internet, or through private digital data networks. Alternatively, a portion of the path between two network interface devices might traverse the PSTN in an analog fashion. Certainly, if a telephone call is made from the first user telephone 20 to the third user telephone 70, that call would necessarily travel through the PSTN 30.

The inventors have developed new systems and methods of delivering voice-based services to users which make use of some aspects of the basic architecture illustrated in FIG. 2. A full description of the systems and methods created by the inventors is provided in U.S. patent application Ser. No. 11/514,116, which was filed on Sep. 1, 2006.

Systems and methods embodying the invention are intended to deliver or provide Voice Applications (hereinafter, "VAs") for a user. Before beginning a discussion of systems and methods that embody the invention, we should start by discussing what a VA is, and what a VA can do for a user. Unfortunately, this is somewhat difficult, because VAs can take a wide variety of different forms, and can accomplish a wide variety of different tasks.

A VA provides a user with the ability to use their natural voice, touch tone sequences or other forms of user input, to access and/or control an application, to obtain information, to perform a certain function, or to accomplish other tasks. Although the majority of the following description assumes that a user will interact with a system embodying the invention, at least in part, via speech, other forms of user interaction fall within the scope and spirit of the invention. For instance, developing technologies that allow a user to make selections from visual menus via hand or eye movements could also for the basis of a user interaction protocol. Likewise, developing technologies that are able to sense a user's brainwave patterns could form the basis of a user interaction protocol. Thus, systems and methods embodying the invention are not limited to speech-based user interfaces.

A VA could be specifically developed to utilize the benefits of speech recognition-based input processing. For instance, a VA could be developed to access, play and manipulate voice mail via speech commands. Alternatively, a VA could act as an extension or an enhancement of traditional GUI-like applications to allow the traditional applications to be accessed and/or controlled by speech commands. For instance, a VA could allow the user to call up specific e-mail messages on a display via spoken commands, and the user would then read the e-mail messages on the display.

Figure 3:
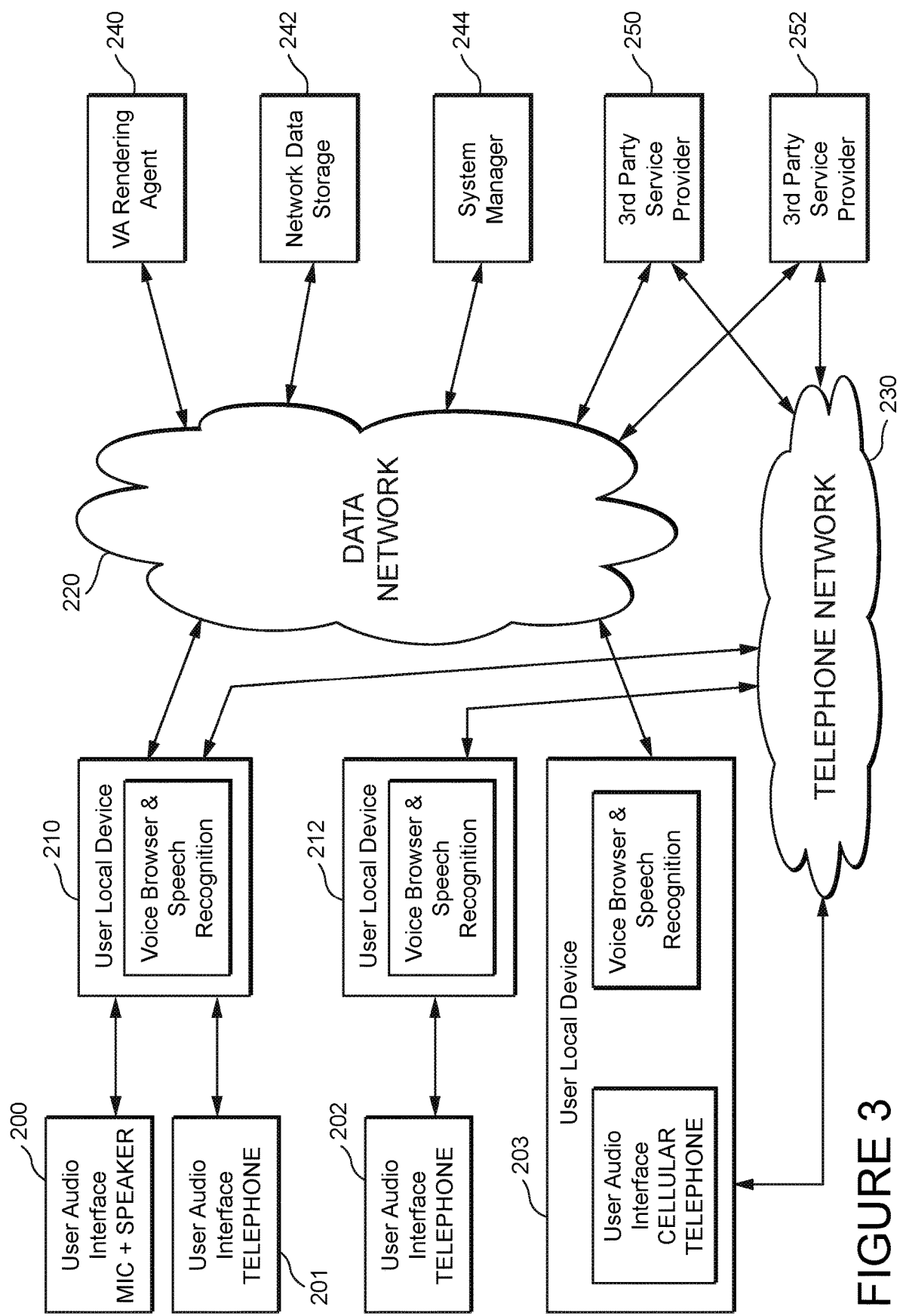
FIG. 3 is a diagram illustrating elements of a system embodying the invention.
Figure 4:
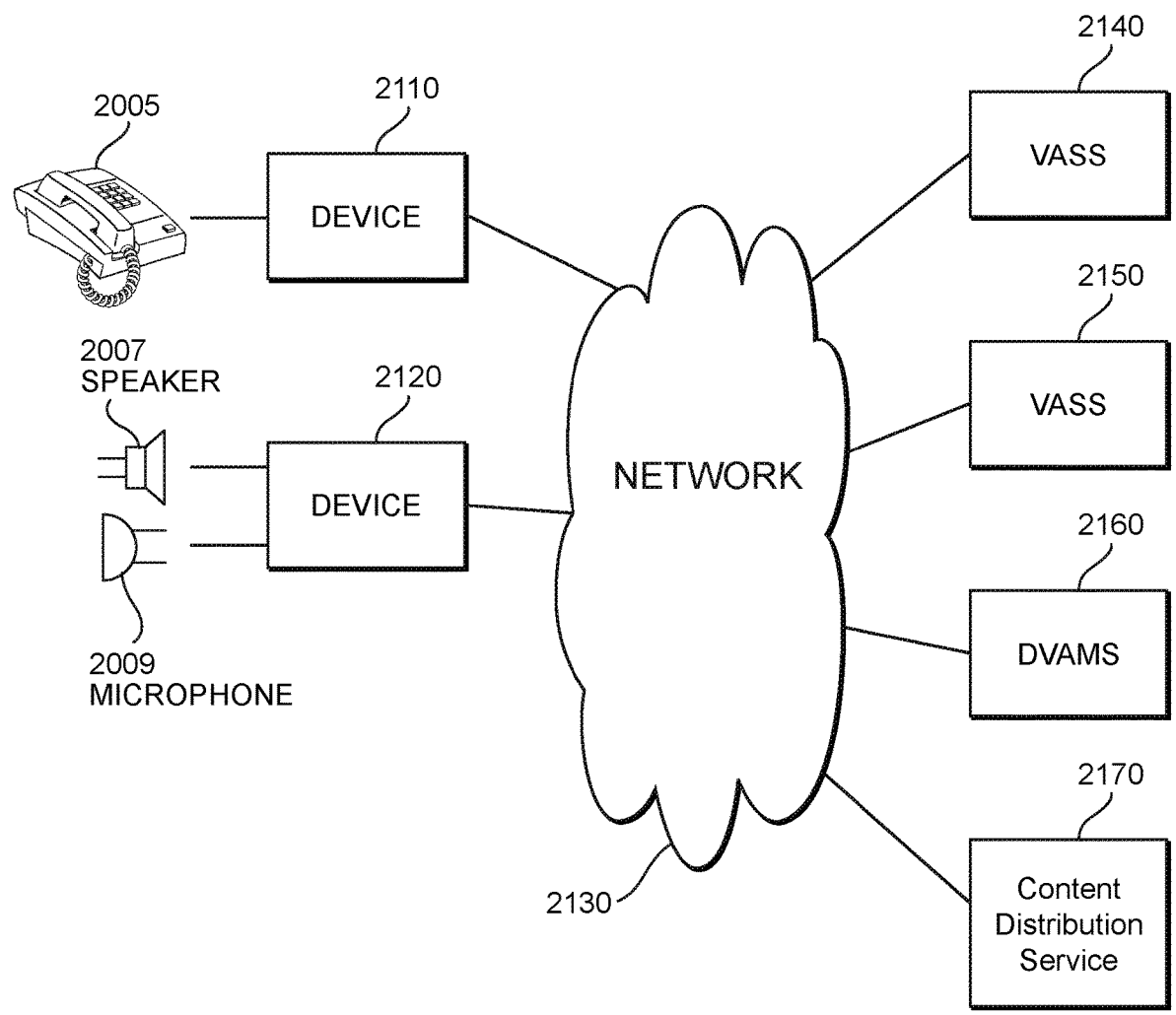
FIG. 4 is a diagram illustrating elements of another system embodying the invention.

Systems embodying the invention, as shown in FIGS. 3 and 4, will be referred to as having a Distributed Voice Application Execution System Architecture (hereinafter, a "DVAESA"). Thus, the term DVAESA refers to a system and method of providing voice application services in a distributed fashion, over a network, to a customer device. Such a system is closely managed by a centralized system to, among other things, ensure optimum performance, availability and usability. In some of the descriptions which follow, there are references to "DVAES-enabled" equipment or local devices/device. This means equipment and/or software which is configured to act as a component of a DVAESA embodying the invention.

In some instances, a VA could act like one of the interactive voice response systems that are accessible to users on prior art centralized voice services platforms. A VA could act in exactly the same way as a prior art IVR system to allow a user to obtain information or accomplish various functions using a speech enabled interface. However, because of the advantages of the new DVAES architecture, a system embodying the invention can perform voice applications that would have been impossible to perform on prior art centralized voice services platforms. Other VAs could perform a wide variety of other tasks. In most instances, the user would be able to accomplish functions or obtain information by simply speaking voice commands.

With the above general description of a Voice Application (VA) as background, we will now provide an overview of systems and methods embodying the invention. The following overview will make reference to FIG. 3, which depicts a high-level diagram of how a system embodying the invention would be organized.

As shown in FIG. 3, preferred embodiments of the invention would make use of an optional telephone network 230 and a data network 220. The telephone network 230 could be a traditional PSTN, a VoIP system, a peer-to-peer telephone network, a cellular telephone network, or any other network that allows a user to place and receive telephone calls. The data network 220 could be the Internet, or possibly a private or internal local area network or intranet.

In some instances, users would only be physically coupled to a data network, such as the Internet. In this case, the user's on-site equipment could enable them to place VoIP telephone calls via the data network. Such VoIP telephone calls might make use of the PSTN, or the entire call might be handled over the data network. Regardless, in preferred embodiments, the user would be capable of simultaneously maintaining a telephone connection and sending and receiving data.

A user would utilize an audio interface device to access the DVEASA. In the embodiment shown in FIG. 3, a first user's audio interface 200 comprises a microphone and speaker. A second user audio interface 201 comprises a telephone. The telephone 201 is also connected to the same user local device 210 as the first user audio interface. A third user's audio interface 202 could also comprise a telephone. This telephone 202 could be a regular wired telephone, a wireless telephone or even a cellular telephone. The DVAES-enabled devices may support multiple audio interface devices, and the multiple devices could all be of the same type, or multiple different types of user audio interfaces could all be connected to the same local device.

Each user would also make use of a local DVAES-enabled device that would act to deliver or provide VAs to the user through the user's audio interface. The local DVAES-enabled devices would include a voice browser capable of performing voice applications that have been distributed over the network, some of which may have speech recognition functions. Such voice applications could be pre-delivered to the local DVAES-enabled device, or the voice applications could be fetched in real time. Such voice applications are personalized to the user and optimized for the device. In the embodiment shown in FIG. 3, each of the user local devices 210, 212, 203 are coupled to the respective user audio interfaces, and to the data network.

In some embodiments of the invention, a user audio device and a DVAES-enabled device could be integrated into a single electronic device. For instance, a PDA with cell phone capability could also incorporate all of the hardware and software elements necessary for the device to also act as the DVAES-enabled equipment. Thus, a single user device could function as both the DVAES-enabled equipment that communicates with the network, and as the user audio interface. The user local device 203 shown in FIG. 3 is intended to illustrate this sort of an embodiment.

Also, in FIG. 3, various lines connect each of the individual elements. These lines are only intended to represent a functional connection between the two devices. These lines could represent hard-wired connections, wireless connections, infrared communications, or any other communications medium that allows the devices to interact. In some instances the connections could be continuous, and in others the connection could be intermittent. For instance, an audio interface and a user local device could be located within a user's vehicle. In such a case, the local device within the vehicle might only be connected to the network through a cellular telephone network or through another type of wireless network when such connectivity is required to provide a user with services. In a similar embodiment, the local device in the user's vehicle might only link up to the network when the vehicle is parked at the user's home, or some other location, where a wireless connection can be implemented.

Also, the user audio interface 202 shown in FIG. 3 could be a cell phone that is capable of interacting with the normal cellular telephone network. However, the cellular telephone might also be capable of interacting with the user local device 212 via a wired or wireless connection. Further, the cellular telephone 202 might be configured such that it acts like a regular cellular telephone when the user is away from home (and is not connected to the local device 212). But the cellular telephone might switch to a different operating mode when it is connected to the local device 212 (when the user is at home), such that all incoming calls to that cell phone are initially received and processed by the local device 212. The DVAESA also would include some network-based elements. As shown in FIG. 3, the network-based elements could include a VA rendering agent 240, a network storage device 242 and a system manager 244. Each of these network-based elements would be connected to the data network.

Also, although they would not technically be considered a part of the DVAESA, there might also be some third party service providers 250, 252 which are also connected to the data network, and/or to the telephone network. As explained below, the VAs may enable the users to interact with such third party service providers via the data and telephone networks.

When a DVAESA as shown in FIG. 3 is configured, VAs would be "rendered" by the VA rendering agent 240, the output of the rendering process would be rendered VAs. These rendered VAs may be stored on the Network Storage Device 242, or be distributed or delivered to a DVAES-enabled Device. "Rendering" refers to a process in which a generic VA is personalized for a particular user and/or one or more particular DVAES-Devices to generate Rendered VAs. The system manager 244 could instruct the VA rendering agent 240 to render a VA for a particular user, or such rendering request could originate from the DVAES-enabled Device. The DVAESA network data storage element 242 could be used to store generic VA, rendered VAs, or a wide variety of other data and resources (e.g. audio files, grammars etc).

As mentioned above, the VA rendering agent would personalize a generic VA during the rendering process. This could take into account personal traits of the individual user, information about the configuration of the local device(s), or a wide variety of other things, as will be explained in more detail below. The information used to personalize a VA during the rendering process could be provided to the VA rendering agent at the time it is instructed to render the VA, or the VA rendering agent could access the information from various data storage locations available via the data network.

The user's local devices would typically be inexpensive computing devices that are capable of running a voice browser and performing speech recognition capable rendered VAs. Such devices are often referred to as embedded multimedia terminal adaptors (EMTAs) and optical embedded multimedia terminal adaptors (OEMTAs). In many instances, the local device would be physically present at the user's location, such as a home or office. In other instances, however, the local device could be a virtual device that is capable of interacting with one or more user audio interfaces. As mentioned above, the local devices may also store rendered VAs, and then act to perform the rendered VAs to the user's audio interface. The user local device could be a customer premise device that is also used for some other function. For instance, the local device could be a cable modem or set-top box that is also used to connect a television to a cable network, however, the device would also be configured to perform VAs for the user via the user's audio interface.

In one simple embodiment of the invention, a local embedded device 212 would be linked to a user's telephone 202. The local device 212 would also be linked to the Internet 220 via a medium to high speed connection, and possibly to the telephone network 230. The user could speak commands into the telephone 202, and those spoken commands would be processed by the local device 212 to determine what the user is requesting.

The processing and interpretation of a user's spoken commands could be entirely accomplished on the local device 212. In other embodiments, the local device might need to consult a speech recognition engine on a remote device, via the data network, to properly interpret a portion of a spoken command that cannot be understood or interpreted by the local device. In still other embodiments, the user's spoken commands could be entirely processed and interpreted by a remote speech recognition engine. For instance, a recording of the user's spoken commands could be relayed to a remote speech recognition engine, and the speech recognition engine would then process the spoken commands and send data back the local device indicating what the user is commanding. Even this process could be accomplished in real time such that the user is unaware that the interpretation of his spoken commands is being accomplished on a remote device.

Once the spoken command has been interpreted, in some instances, the local device 212 may be able to satisfy the user's request. In other instances, the local device 212 might need to request information from a VA Rendering Agent 240 to satisfy the user's request. If that is the case, the local device 212 would send a query over the data network 220 to the VA Rendering Agent 240 for some type of content. The requested content would be returned to the local device 212, and the local device 212 would then provide the content to the user via the user's telephone 202. In other instances, the local device may be able to query other network-connected elements which are not a part of the DVAES Architecture, and those other elements would return the requested data to the local device so that the data could be delivered to the user via the audio interface.

Depending on the VA being performed, the functions that are performed in response to a user request may not involve playing audio information to the user via the user's audio interface. For instance, the local device could be performing a VA relating to accessing e-mail. In this instance, a user's spoken request could cause the local device to act in a manner that ultimately results in the user's e-mail messages being shown on a display screen. In this instance, although the user makes use of a speech-based interface to obtain information and/or perform a certain function, the ultimate result is not the playback of audio, but rather display of an e-mail message.

The end result of a user request could take many other forms, such as the local device causing a certain action to be taken. For instance, the user might speak a request that causes the user's home air conditioning system to be turned on. The list of possible actions that could be enabled by the local device is virtually endless. But the point is that the local device is able to provide a speech-enabled interface to the user, via the audio interface, to allow the user to accomplish a task.

In another simple embodiment, the user might pick up his telephone 202 and speak a request to be connected to another person's telephone. A voice application performed on the local device would interpret the user's spoken request. This might involve utilizing speech recognition assets on remotely located devices, to accomplish all or part of the speech recognition tasks. The voice application would then take steps to place a telephone call to the person identified by the user. This might involve connecting the user via the telephone network 230, or connecting the user to the requested party via a VoIP call placed over the data network 220.

It is also worth noting that when a user is connected to the DVAES architecture, the VAs provided by the system can completely replace the dial tone that people have come to associate with their telephones. The moment that a user picks up his telephone, he will be launched directly into a voice application that is provided by the system. In the past, this may have been technically possible, but it was always accomplished by making use of the traditional phone system. For instance, one of the prior art centralized voice services platforms would have been capable of ensuring that the moment a user lifts his telephone, that user was immediately connected to a central voice services platform that would guide the remainder of the user's experience. But this was always accomplished by establishing an immediate voice channel between the user's telephone and the central voice services platform. And to accomplish that, it was necessary to involve the telephone carrier that would link the user's telephone to the voice services platform. In contrast, with the DVAES architecture, one no longer needs to make any use of the telephone carriers to provide this sort of a service. And, as noted above, the user can still be easily connected to the regular telephone network if he needs to place a call.

In the same vein, in the past, whenever a user wanted to have a third party service answer his telephone calls, as in traditional voice mail systems, it was necessary to involve the carrier in routing such calls to a third party service. Now, when a call is made to the user's telephone, the DVAES architecture makes it possible to answer the call, and take voice mail recordings, without any further involvement of the carrier. Here again, the DVAES architecture makes it possible to eliminate the services of the telephone carrier.

In both the examples outlined above, the involvement of the carrier necessarily increased the cost of providing the voice services. Because the carrier can be eliminated, the same sorts of voice services can be provided to a user for significantly reduced costs. And, as explained below, the services can be delivered with greater performance and with new and better features.

In some embodiments, rendered Voice Application processing is performed on the local device and the associated voice recognition functions may also be performed on the local device. For this reason, there is no need to establish a dedicated duplex audio link with a remote high end computer. Also, even in those instances where a portion of the voice application processing is performed by a remote device, and/or where processing and interpretation of spoken commands is processed by a remote device, the communications necessary to accomplish these actions can be made via data packets that traverse a data network. Thus, here again, there is no need to establish a dedicated duplex audio link with a remote high end computer to provide the requested services.

Also, because the local embedded device is coupled to a data network such as the Internet, it can rapidly obtain Rendered Voice Applications and associated data from various remote sources in order to satisfy user requests. For these reasons, the simple embedded local device allows one to provide the user with speech recognition enabled Voice Applications without the need to create and maintain a high end speech service platform with multiple telephone line access equipment.

As noted above, the local device could also use the network to obtain access to various other physical elements to effect certain physical actions, such as with the home air conditioner example given above. In this context, the other physical elements could be connected to the network, or the local device could have a local connection to physical elements that are also located on the user's premises. For instance, the local device could have a hard-wired or wireless connection to many different elements in a user's home or office that allow the local device to control operations of the physical elements. In other embodiments, the piece of physical equipment could act as the local device itself.

One obvious advantage of a DVAESA over prior art voice service platforms is that a DVAESA embodying the invention can provide VAs to users without any involvement of a PSTN, VoIP, Peer-Peer carrier. The instant the user picks up his telephone handset, he will be interacting with the DVAESA, not the telephone system. A large number of VAs could be accomplished without ever involving a telephone carrier as the Voice Application is delivered and provided on the local device. Because the user can directly access the DVAESA without making a telephone call, the operator of the DVAESA will not need to pay a telephone carrier in order to provide the service to users.

As noted above, if the user wishes to place a telephone call, this can be easily accomplished. But there is no need to use a telephone carrier as an intermediary between the user and the DVAESA. This has multiple positive benefits.

Also, for a multitude of different reasons, a DVAESA will be less expensive to deploy and operate than the prior art central voice services platforms. To begin with, because the DVAESA can provide services to users without a telephone link, the DVEASA operator no longer need to purchase and maintain multiple telephone line ports into the system.

Also, the types of equipment used by the DVAESA are inherently less expensive to deploy and manage than the equipment used in a central voice services platform. A DVAESA embodying the invention uses relatively inexpensive network appliances that can be located anywhere, and that can be deliberately distributed over a wide area to enhance reliability of the system. In contrast, a central voice services platform requires expensive and specialized telecom equipment like telecom switches and IVR servers. The central voice services platforms also require more intensive management and provisioning than a DVAESA, and this management must be provided by highly skilled personnel as most of the equipment used is highly proprietary in nature. In contrast, the DVAESA is largely managed by an automated management system, as will be described in detail below. A prior art central voice services platform is only able to simultaneously service a limited number of users As noted above, in the prior art central voice services platforms, a dedicated voice link, via a telephone call, is maintained for each connected user. Once all lines are connected to users, no additional users are able to access the system. Hence the maximum number of simultaneous users that can be supported at any given time is equal to the lesser of the number of access lines or the number of associated telephony/IVR ports an operator maintains.

In contrast, a DVAESA embodying the invention has a very high limit on the number of users that can be simultaneously serviced. In a DVAESA embodying the invention, the moment a customer picks up his telephone he will be connected to the system. Thus, a DVAESA embodying the invention is "always on." Also, much of the interactions between the user and the system are handled directly by the local device on the customer premises. If the local device cannot immediately service a user request, and additional information is needed, the local device may make a synchronous or asynchronous request over the Internet. Typically, the information will be quite rapidly returned and played to the user. Thus, even if there is a small delay, the user is nevertheless still connected the voice services system.

With the DVAESA model, the same number of server assets can handle data requests from a much larger number of users as compared to the prior art central voice services platform. This is also another reason why a DVAESA is less expensive to deploy and maintain than a prior art central voice services platform.

In addition to being easier and less expensive to deploy and maintain, a DVAESA embodying the invention can also scale up much more quickly and at a lower cost as new users are added to the system. To begin with, because the DVAESA does not require dedicated telephone lines to operate, there is no cost associated with adding additional telephone ports to the system to accommodate additional users. Likewise, as new users are added, there are no new additional telecommunications expenses for more connect time or access. In addition, for the reasons noted above, the equipment used by the system is far less expensive than the equipment used in a central voice services platform to service the same number of users. Thus, adding any new equipment and users is less expensive for a DVAESA. Moreover, because it requires less equipment to service the same number of users in a DVAESA, there is much less equipment to purchase and maintain for each additional 1000 users.

A DVAESA embodying the invention is inherently more reliable than a prior art central voice services platform. Because the assets of a prior art system are typically located in a few physical locations, and are tied to physical phone lines, power outages and other physical problems are more likely to prevent users from being able to use the system. In contrast, a DVAESA can have its equipment distributed over a much wider area to reduce these problems. The points of a failure of a DVAESA can be highly localized and it is very cost effective to replicate DVAESA equipment.

Moreover, the underlying nature of the DVAESA makes it easy to connect multiple redundant servers to the network, so than in the event one or more assets fail, redundant assets can step in to take over the functions of the failed equipment. This was difficult to do in prior art central voice services platforms, and even when it was possible to provide redundant capabilities, the cost of providing the redundant equipment was much higher than with a DVAESA.

In addition, a prior art central voice service platform needs a telephone carrier to provide access to the users. If the telephone carrier has a service outage, the prior art system cannot function. In contrast, a DVAESA does not have any reliance on a telephone carrier.

The only network required to provide the DVAESA is the data network like the Internet. The user in most cases will not experience an interruption to access to the voice services of a DVAESA, even if there is an outage that disables the local device's access to the Internet. The local device could potentially perform some of the applications without connecting to the network. This indicates that for some Voice Applications in the DVAESA, it may be sufficient for the local device to have intermittent access to the Internet The architecture of a DVAESA makes it inherently able to deliver certain types of VAs with vastly improved performance. To use one concrete example, as noted above, when a central voice services application is attempting to deliver the same audio message to large number of users, the central voice services application must place a telephone call to each user, using a dedicated phone line, and deliver the message. Because the central voice services platform only has a limited number of outgoing lines, it can take a significant amount of time to place all those calls.

In contrast, in a DVAESA embodying the invention, it is not necessary to place any telephone calls to deliver the audio message to users. Instead, a server which is part of the system can push instructions to play the audio message, and the message itself (the message could be stored in advance of when the event to deliver the message occurs), to each of the local devices, and the local devices can then play the messages for each individual user. In variations on this theme, the server might only send the instruction to play the message, along with a reference to where a copy of the audio message is stored. Each local device could then download a copy of the message from the indicated location and play it for the user. Regardless, it would be possible for the DVAESA architecture to deliver the audio message to all the users in a small fraction of the time that it would take the prior art central voice services platform to accomplish the job.

Moreover, as also explained above, while the prior art central voice services platform is making calls to deliver audio messages to a plurality of users, it is tying up it's phone lines, and thus it's capacity to allow users to call in for services. In contrast, when a DVAESA is delivering audio messages to a plurality of users, the users are still able to access their voice services for other purposes.

A DVAESA embodying the invention also makes it possible to deliver many new voice applications and services that could never have been provided by the prior art central voice services platform. Several examples are provided below. In most cases, it is the underlying differences in the architecture of a DVAESA embodying the invention, as compared to the prior art voice services platforms, which make these new services possible.

In the past, the user would either need a telecom provider or a voice services provider to intercept incoming calls and provide voice services like an auto attendant, call screening, or voice messaging. Such call services were possible, but were expensive (feature and toll charges) and complicated to operate as they needed the constant support of the service provider (due to technology complexities). Such services also usually required cumbersome touch tone sequences to enact and control the services. The DVAESA makes such services available to the user in a very cost effective manner, and the services can be easily controlled using the local device powered by Voice Applications that are distributed over the network.

In another example, the user could configure a voice application to run constantly in the background on a local device, and then take a certain action upon the occurrence of a specified event. So, for instance, the user could set up a voice application to break into an existing telephone conversation to notify him if a particular stock's trading price crosses a threshold. In this scenario, the voice application would periodically check the stock price. If the threshold is crossed, the voice application could cause any existing telephone call that the user is on to be temporarily suspended, and the voice application would then play the notification. The voice application could then return the caller to his call. This sort of a voice application would also be very complicated to provide under the prior art central voice services platform.

The graceful integration of advertising messages is another example of how a DVAESA embodying the invention can provide services that were impossible to provide with prior art central voice service platforms. As an example, if the user lifted the telephone and spoke a command that asked for options about ordering a pizza, the system could respond with a prompt that said, "to be connected to Pizza Shop A, say one; to be connected to Pizza Shop B, say two. By the way, Pizza Shop A is having a two for one special today." Thus, the advertising message could be gracefully incorporated into the played response. Also, the advertising message would be highly context relevant, which would make it more interesting to advertisers. Thus, advertising revenue could be collected by the operator of the DVAESA system.

A DVAESA embodying the invention could also be used to rapidly collect data from a very large number of users in ways that would have been impossible with prior art central voice services platforms. In this example, assume that a television program is currently airing, and during the program, viewers are invited to vote on a particular issue. In prior art systems, the users would typically place a telephone call to a central voice services platform and make a voice vote. However, as noted earlier, prior art voice services platforms are only able to talk to a limited number of callers at the same time because the callers must be connected by dedicated phone lines.

In a DVAESA embodying the invention, the user might be able to pick up the phone and say, "I want to vote on issue X." The system would already know that viewers of a television program had been invited to place a vote, so the system could immediately take the user's voice vote. The system could also tabulate the votes from all users making similar voice votes, and then provide the voting results to the television show producers in real time. Because so little actual information is being exchanged, and the exchanges are made over the Internet, thousands, and perhaps even millions of votes could be received and tabulated in a very short period of time. This would have been impossible with prior art central voice services platforms. Furthermore, a DVAES can distribute a fully featured voice application that not only plays the message, but further solicits feedback from the user, optionally tailors the interaction with the user, and may record any user feedback or responses. Furthermore, if the producers of the television show were willing to pay a fee to the operator of the DVAESA, the system could be configured such that as soon as viewers are invited to cast a vote, and for the duration of the voting period, anytime that a user of the DVAESA picks up his telephone to access the system, the system would first respond with the question, "would you like to vote on issue X?" This would be yet another way to derive advertising or promotional revenue from the DVAESA.

There are countless other ways to exploit the architecture of a DVAESA embodying the invention to accomplish tasks and to perform VAs that would have been impossible using the prior art central voice services platforms. The above examples are merely illustrative.

A DVAESA embodying the invention also allows for much greater personalization of the voice applications themselves than was possible with prior art central voice services platforms. In addition, the architecture allows the users themselves to control many aspects of this personalization.

To begin with, as explained above, in a DVAESA a VA Rendering Agent is responsible for customizing voice applications, and then delivering the customized voice applications to the local devices at the customer sites. Thus, the basic architecture assumes that each user will receive and run personalized versions of voice applications. This difference alone makes it much, much easier to provide users with personalized voice applications than prior art central voice services platforms.

The VA Rendering Agent could personalize a voice application to take into account many different things. For instance, the VA Rendering Agent could access a database of user personal information to ensure that a VA takes into account things like the user's name, his sex, age, home city, language and a variety of other personal information. The VA Rendering Agent could also access information about the capabilities of the local device at the customer's location that will be providing the VA, and possibly also the type of audio interface that the user has connected to the local device. The VA Rendering Agent could then ensure that the customized version of the VA that is provided to the user's local device is able to seamlessly and efficiently run on the local hardware and software. The VA Rendering Agent could also take into account user preferences that the user himself has specified. For instance, the VA could be customized to play audio prompts with a certain type of voice specified by the user.

Another important way that VAs could be personalized is by having the DVAESA track how the user is interacting with the system. For Example if the user has a certain type of accent or has a certain pattern of use or has a certain type of background noise, the VA Rendering Agent could take these factors into account on an on going basis to ensure that the customized VAs that are sent to the user are tuned to the user. The system might also note that whenever a three choice menu is played to the user, the user always makes the third selection. In that case, the VA Rendering Agent might be directed to re-render the VA so that the VA presents the third option first, instead of last.

There are any number of other ways that VA's could be customized or personalized to take into account aspects of individual users. And these customizations are easily and automatically accomplished by configuring the VA Rendering Agents to automatically incorporate these personalizations when delivering VAs for users. Because the DVAESA is configured so that each individual user may have his own versions of VAs, preferably stored on his local devices cache, this personalization is not difficult to accomplish. Such personalizations are complimented by the continuous analytics process that is being performed on DVAESA data. This data is collected during the on going functioning of the system and is provided by all DVAESA components. After collection, the data is analyzed, and the results of the analysis are used to continuously tune and improve the functioning of the system on an individual user-by-user basis.

A DVAESA also allows for better, more direct billing for delivery or usage of services. Because there is no telephone company acting as an intermediary, the operator of a DVAESA can directly bill users for use of the system. Also, the way the system is configured, the user can select individual services, which are then provided to him by rendering a VA and loading it on the user's local equipment. Thus, the user can tailor his services to his liking, and the operator of the DVAESA has an easy time tracking what services the user has. For all these reasons, it is much easier to bill the user for use of the services.

Another benefit that flows from the DVAESA model is the ability of a user to access services provided from two different DVAESA operators on a single piece of local equipment. As will be explained in more detail below, a first DVAESA operator could load a first set of VAs onto the user's local equipment, and a second DVAESA operator could load a second set of VAs onto the same piece of operator equipment. For instance, the first DVAESA operator could be one that provides the user with services related to his business, and the second DVAESA operator could be one that provides the user with services relating to the user's personal life. There is no inherent conflict in both having two different sets of VAs loaded onto the local device. And each DVAESA operator can thereafter maintain and update their respective VAs. Likewise, the user can cause both sets of VAs to be loaded on a first device at his office, and a second device at his home. This allows the user to easily and immediately access services from either operator, regardless of his present location. This sort of flexibility would also have been completely impossible in prior art central voice services platforms.

A DVAESA can also provide enhanced security measures compared to prior art central voice services platforms. For instance, because the DVAESA is interacting with the user via spoken commands, it would be possible to verify the identity of a user via a voice print comparison.

In addition, the individual local devices can be identified with unique ID numbers, and credentials verifying the identify and permissions of users and devices can all be created and stored in various locations on the system. By using these unique identification numbers and certification files, one can ensure that only authorized users can access sensitive information or perform sensitive functions.

Having now provided a broad overview of the how a system embodying the invention would operate, and the inherent advantages of a DVAESA system as compared to prior art systems, we will now turn to a slightly more specific description of the main elements of a DVAESA embodying the invention, with reference to FIG. 4. In doing so, we will introduce some new definitions and terminology which will be used throughout the following detailed description. Once this more detailed overview is complete, we will then turn to a much more detailed description of preferred embodiments of each of the system elements, and descriptions of preferred methods of accomplishing various functions.

A DVAESA would be configured to deploy and utilize one or more Voice Application Agents (hereinafter "VAAs") which themselves enable the delivery of a VA through a local device that would typically be located in a user's home or office. In some instances, a VAA may be wholly resident on a single local device. In other instances, the functions of a VAA may be split between multiple portions of the overall system. Likewise, a single local device may only be hosting one VAA. Alternatively, a single local device may host multiple VAAs. These variations, and the flexibility they provide, will be discussed in more detail below. The important concept is that a VAA is the agent that is responsible for delivering or performing a VA for the user.

The network 2130 shown in FIG. 4 could be the Internet. However, in some instances, the network 2130 could be a public or private local network, a WAN, or a Local Area Network. In most instances, however, the network 2130 will be the Internet. Also, the network 2130 could also comprise portions of the PSTN, existing cellular telephone networks, cable television networks, satellite networks, or any other system that allows data to be communicated between connected assets.

The devices 2110 and 2120 appearing in FIG. 4 would be the local embedded devices that are typically located at a user's home or office. As shown in FIG. 4, in some instances, a local device 2110 could simply be connected to the user's existing telephone. In other instances, the local device could be coupled to a speaker 2007 and microphone 2009 so that the local device can play audio to the user, and receive spoken commands from the user. In still other embodiments, the local device may be a standalone telephone, or be included as part of a cellular telephone, a computing device with wireless access, a PDA that incorporates a cellular telephone, or some other type of mobile device that has access to a data network.

A system embodying the invention also includes components that deliver voice applications, data and other forms of content to the local devices. These components could include one or more Voice Application Services Systems (hereinafter VASSs). In the system depicted in FIG. 4, there are two VASSs 2140 and 2150. A system embodying the invention could have only a single VASS, or could have multiple VASSs.

One of the primary functions of the VASSs is to render VAs and to then provide VA components to VAAs. In preferred embodiments, the VASS would provide customized VAs components to VAAs, upon demand, so that the VAAs can perform the customized VAs components for the user. The VASSs could personalize generic VAs based on known individual user characteristics, characteristics of the environment in which the VA components will be performed, information about how a user has previously interacted with the system, and a wide variety factors. The VASS would then distribute the personalized VA components to the VAAs so that the VAAs can perform the VA components for the users. The distribution of the personalized VA components to the VAAs could also be accomplished in multiple different ways.

A system embodying the invention may also include one or more Content Distribution Services (hereinafter a "CDSs"). This is an optional component that basically serves as a storage and content distribution facility. If a system embodying the invention includes one or more CDSs, the CDSs would typically provide network-based caching of content, such as VA components, configurations, DVAESA components, and other shared or frequently used content. The CDSs would be deployed throughout the network to help reduce network traffic latency, which becomes particularly noticeable in any speech interaction system.

The DVAESA components could broadly be identified as a Distributed Voice Application Execution System (hereinafter, a "DVAES"), and a Distributed Voice Application Management System (hereinafter, a "DVAMS") A DVAES comprises at least a VASS, one or more VAAs, and the underlying hardware and software platforms.

The system shown in FIG. 4 includes a DVAMS. The DVAMS handles a wide variety of management functions which include registering users, specific items of hardware and other DVAES components, directing the rendering, caching, distribution and updating of VAs components, organizing and optimizing the performance of system assets, and multiple other functions. The DVAMS may also include an interface that allows an individual user to customize how the system will interact with him, and what products and services the user wishes to use. The DVAMS would also provide an interface that allows system operators to manually control various aspects of the system.

This brings us back to a more detailed description of how the telemarketing functions described above can be provided at a lower cost and with greater flexibility than in the past. This discussion will refer to FIG. 5, which illustrates elements of both the DVAES architecture discussed above, and additional elements of a typical PSTN, a cellular telephone network, and IP enabled telephones that communicate via a high speed data connection to the Internet.

Figure 5:
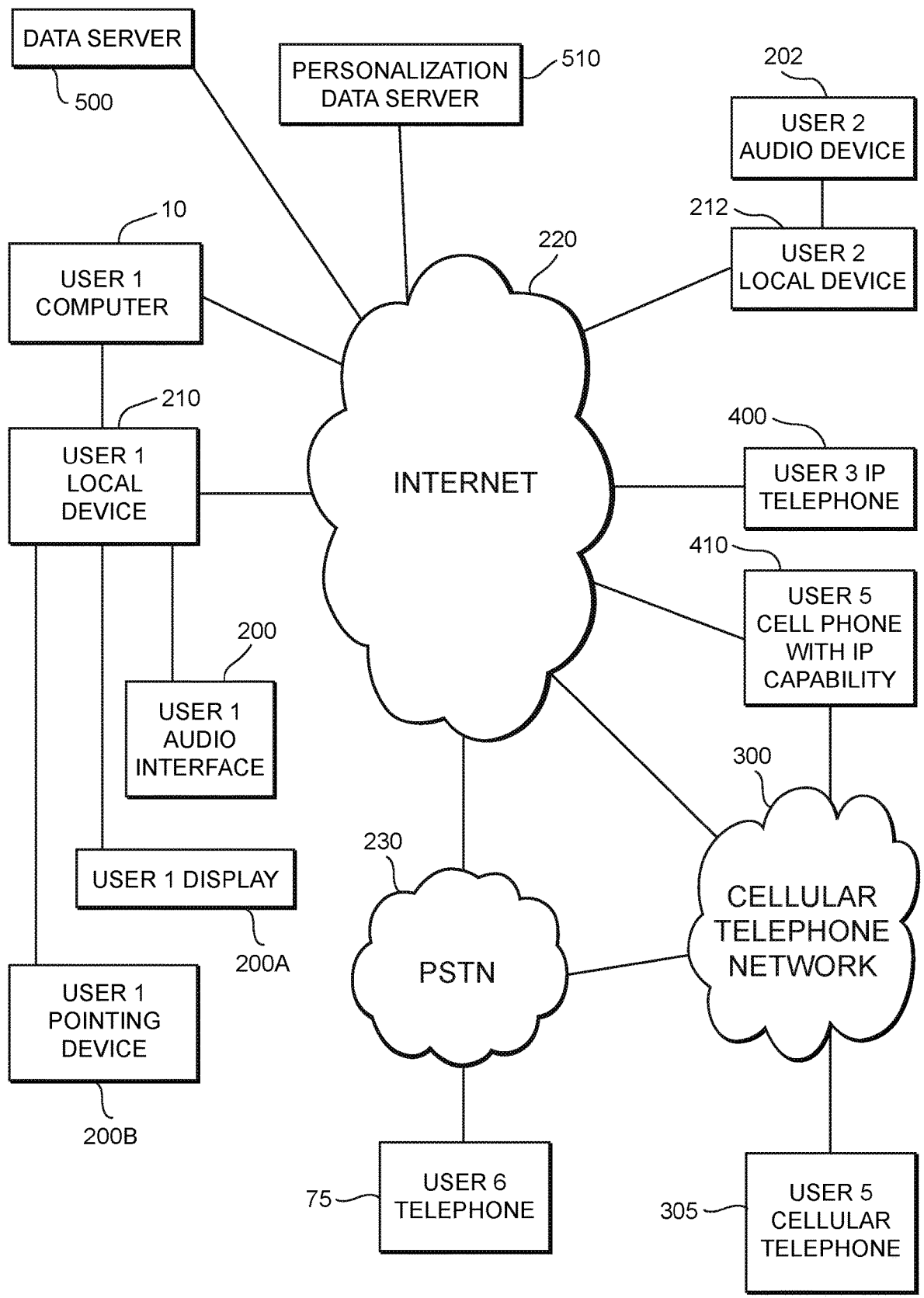
FIG. 5 is a diagram illustrating elements of another system embodying the invention.

As shown in FIG. 5, User 1 has a local device 210 that is connected to the Internet 220. User 1 also has an audio interface 200 that is connected to his local device 210. As mentioned above, this audio interface could be a headset such as the ones used by telemarketers. User 1 would also have a computer 10 that is coupled to the Internet. This Internet connection could be made directly, or via the local device 210. Also, in some embodiments, even where the user computer 10 is directly coupled to the Internet, the user computer 10 could also be connected to the local device 210.

In a very simple embodiment, software resident on the User 1's computer could be designed so that whenever the User highlights and selects a telephone number that appears on the display screen of his computer 10, a voice application performed on the local device is instructed to place a telephone call to that number. This would involve the voice application making a typical VOIP telephone call via the Internet. User 1 would use his audio interface 200 to conduct the call.

User 1's computer could cause the voice application performed on the local device to place the call in multiple different ways. If the computer 10 is directly coupled to the local device 210, signals could be sent from the computer to the local device to instruct the voice application performed on the local device to make the call. Alternatively, the signaling from the computer 10 to the local device 210 could be routed over the Internet. This would eliminate the need for a separate physical or wireless link between the computer 10 and the local device 210.

In a more sophisticated embodiment, a telephone calling software program loaded on User 1's computer 10 could be designed with a user interface that resembles the telemarketing software discussed above in the Background section of this application. The calling software would be designed to allow the user to rapidly place a series of telephone calls using an electronic list of telephone numbers stored on the computer 10. To place a call, the user would highlight and/or select a telephone number on the list. The software would then cause a voice application performed on the local device 210 to place a telephone call to the selected telephone number.

If we assume that User 1 has selected the telephone number for User 6's telephone 75, the telephone call would originate as an IP based call at the local device 210, and it would then be routed through the PSTN to User 6's telephone 75. Basically, a single telephone call would be established to connect User 1 with User 6's telephone.

If User 6 does not answer the call, and User 6's voice messaging system answers the call, it would also be possible for User 1 to cause an audio message to be played to User 6's voice messaging system while User 1 moves on to another call. In this type of a scenario, the software on User 1's computer would instruct the voice application performed on the local device 210 to keep the first telephone call open, and to begin playing a pre-recorded audio message to User 6's voice messaging service on that first telephone call. The computer would also instruct a voice application performed on the local device 210 to place a second telephone call to a new telephone number, and to switch the User 1's audio device 200 over to the second call. One or more voice applications performed on the local device 210 would be capable of performing both operations simultaneously.

Figure 1:
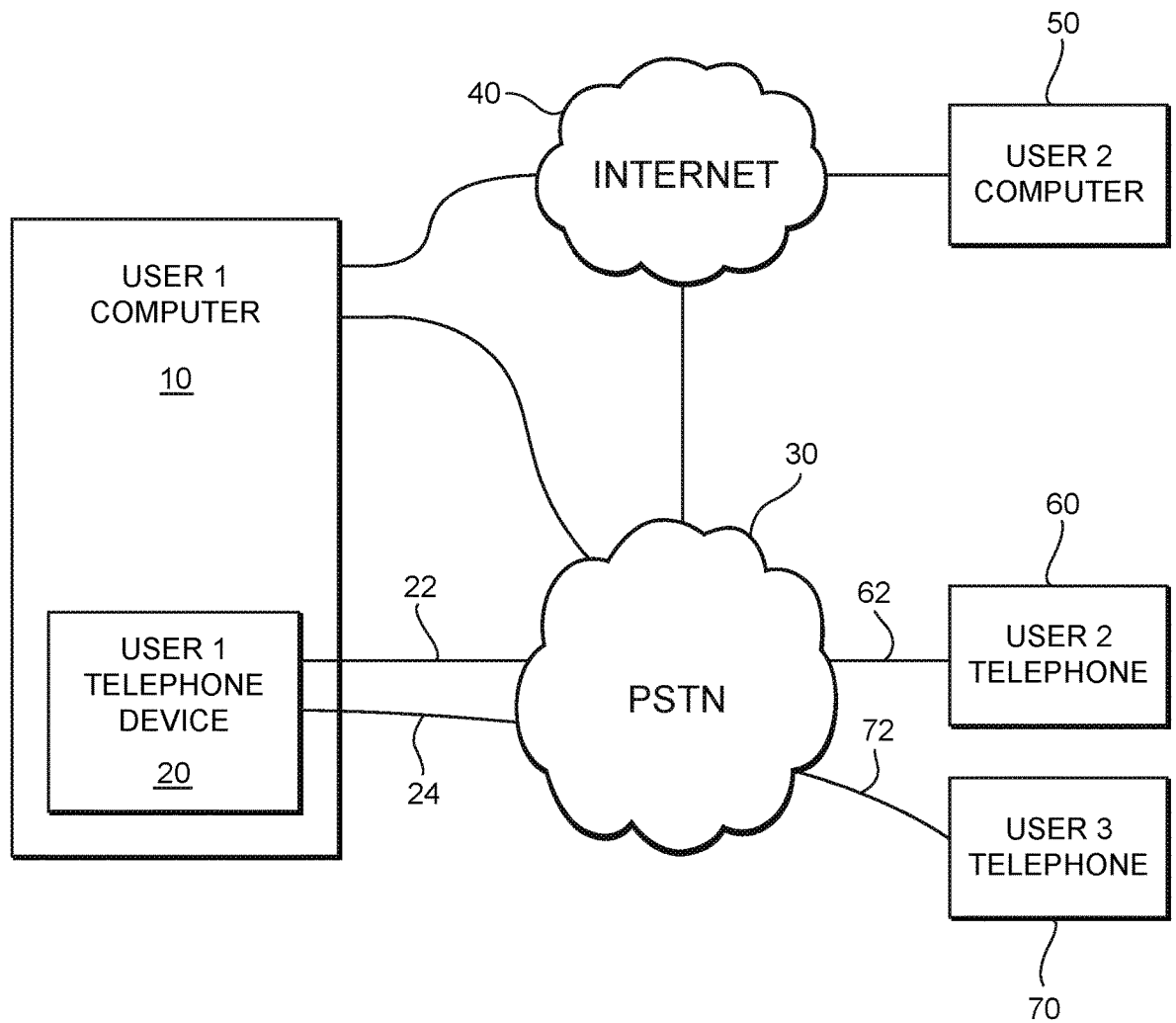
FIG. 1 is a diagram of a background art system architecture that allows a first user to place telephone calls to multiple other parties using a list of telephone numbers stored on a computer.

With the system described above, an audio recording can be played to User 6's voice messaging system while User 1 moves on to another call. The architecture illustrated in FIG. 4 has yet additional advantages as compared to the prior art systems illustrated in FIG. 1. For instance, in the prior art systems illustrated in FIG. 1, it was necessary for the telemarketer to maintain multiple separate telephone lines, each of which has to be connected to the telemarketer's computer. In the system illustrated in FIG. 5, there is no need for the user to maintain multiple separate telephone lines (and separate telephone numbers) in order to establish multiple simultaneous calls.

Moreover, if a telemarketer has only two telephone lines connected to his computer, he could only place two calls at once. In other words, the telemarketer could not have a pre-recorded audio message playing to two different voice messaging systems while he moves on to a third call. He would have to wait for one of the lines to become free before placing another call. In contrast, with a system as illustrated in FIG. 5, the telemarketer could cause his system to simultaneously play a pre-recorded audio message to a large number of different voice messaging systems, while still moving on to another call.

In addition, with a system as illustrated in FIG. 5, it might not be necessary for User 1 to make any use whatsoever of the PSTN. For instance, assume that one of the parties that User 1 wants to call is User 2, and that User 2 also has a telephone or an audio device 202 connected to the Internet via a local device 212. In this instance, the telephone call established between User 1 and User 2 would pass entirely through the Internet 220. This call would never traverse the PSTN. Because none of the elements of the PSTN are used to accomplish the call, it could be less expensive to place the call.

Moreover, some cellular telephones available today are capable of establishing telephone calls through the cellular telephone network, or via an IP connection to a nearby wireless router. So if User 1 was calling User 5's cellular telephone 410, and the cellular telephone 410 was connected to a wireless router, the entire telephone call would be routed through the Internet, which could result in lower costs to place the call as compared to a situation where the cellular telephone network is used to place the call.

The voice application providing the above-described functionality may be capable of listening to a called party's answering message played from the called party's voice messaging system, and determining when it is appropriate to play the prerecorded audio message. For instance, if a telemarketer instructs the system to place a call to a called party and the call is answered, but the telemarketer knows immediately that a voice messaging service has answered the call as opposed to a live person, the telemarketer could immediately instruct the system to play a prerecorded audio message, and the telemarketer could move on to a new call before the called party's answering service finishes playing its outgoing message. At this point, the voice application being performed on the telemarketer's local device 210 would listen to the remainder of the called party's outgoing message, waiting for the point in time when it is appropriate to begin playing the prerecorded message. When that time arrives, the prerecorded message would be played to the called party's voice messaging service so that it is recorded by the called party's voice messaging service. And once the prerecorded message has fully played, the voice application would terminate the call. All of these actions could occur at the same time that the telemarketer is instructing the voice application to place a new call to a called party, and while the voice application actually places that next call. Further, and as mentioned above, the voice application could end up simultaneously playing multiple prerecorded messages to multiple called party answering services at the same time the voice application is setting up yet another call to a called party.

In the prior art systems described above in the Background section of the application, a single pre-recorded audio message would be played to the voice messaging system of a called party that did not answer a call. But with the architecture illustrated in FIGS. 3-6, multiple different pre-recorded messages can be recorded by the telemarketer, and the telemarketer could choose which message to play each time that it becomes necessary to play a prerecorded message.

As noted above, the prerecorded messages might be stored in multiple different locations. As a result, the voice application being performed by the telemarketer's local device 210 would know to retrieve an audio message from different locations, depending on what the telemarketer specifies.

Figure 6:
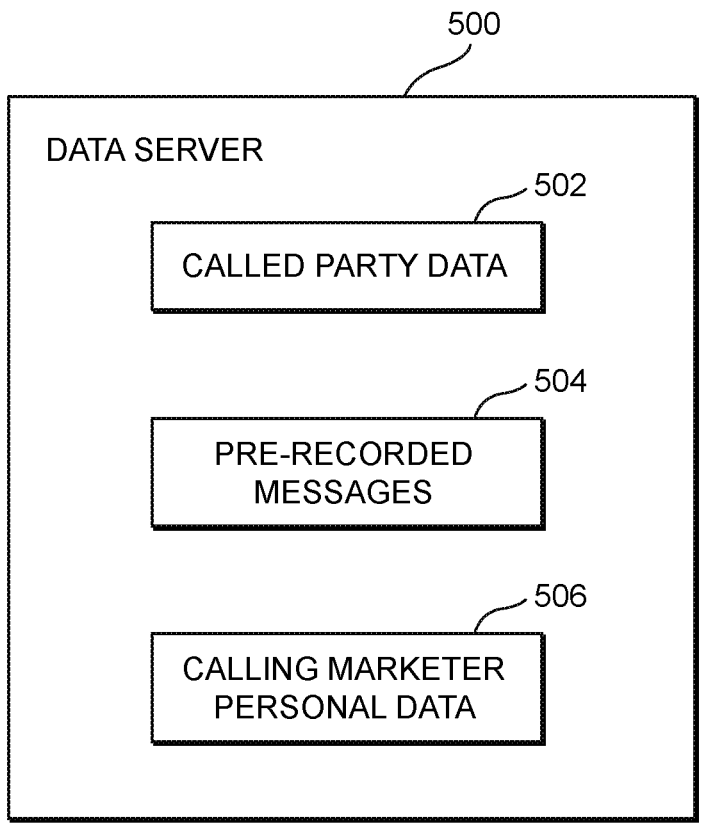
FIG. 6 is a diagram of a remote data server that could be used in a system and method embodying the invention.

FIG. 6 illustrates the functional aspects of a data server that could be used in a system and method embodying the invention. As shown in FIG. 6, the data server could store information about people that a telemarketer wishes to call in a called party database 502. In the simplest embodiments, the called party database 502 would only include a list of telephone numbers that are to be called. In other embodiments, the called party database could include the names of one or more people associated with each telephone number. In other embodiments, the called party database 502 could include additional items of information about the people associated with the telephone numbers, such as age, gender, race, profession, income ranges, personal preferences, along with any other items of personal information that might be helpful to the telemarketer in making a sale to a called party.

In other embodiments, the lists of telephone numbers could be resident on one server, and the telephone numbers could be linked to databases of personal information located on other servers. Thus, all of the information that is available for a potential called party could be located in different physical locations. Regardless, the voice application being performed by the telemarketer's local device would be capable of accessing the required information from the remote locations. And because of the distributed nature of the system, it would not be necessary to store all the information on the telemarketer's computer or local device, or even in the same remote location.

As shown in FIG. 6, the data server could also have a storage location 504 to store one or more prerecorded audio messages. Further, the data server might include a storage location 506 to store information about the telemarketer himself.

When the system stores personal information against the telephone numbers to be called, this personal information can be used to personalize the audio messages that are played to a called party's voice messaging system. The prerecorded audio messages might have locations where the system can insert the called party's name. In other instances, if the gender of the called party is known, the prerecorded audio message might take this into account when describing certain things. Regardless of the type of information that is available, the concept is to use this personal information to customize the audio message. And a voice application being performed on the user's local device would be capable of personalizing a generic prerecorded audio message on the fly as it is played to the called party.

When information about the telemarketer is stored on the system, this information could also be used to personalize a prerecorded audio message. For instance, a generic prerecorded audio message could be personalized to indicate the name of the telemarketer placing the call. Other items of information specific to the telemarketer might also be used to customize a generic prerecorded audio message. And, here again, the voice application being performed on the user's local device would be capable of personalizing a generic prerecorded audio message on the fly as it is played to the called party.

In a similar manner, the voice application might select one of multiple prerecorded audio messages to play to the called party depending upon one or more items of personal information that are stored in the system against a telephone number that has been called. Here again, this allows for customization of the message played to a called party.

If both the calling party and the called party are users of the system, this can allow for yet additional advantages and potential cost savings. Assume that User 1 is placing a call to User 2, and User 2 has a local device 212 which is part of the system. User 2's local device 212 would also be capable of performing voice applications for User 2 via User 2's audio interface 202.

If this is the case, then when User 1 instructs a voice application performed on User 1's local device to place a call to User 2, that call would initially be received by a voice application performed on User 2's local device 212. If User 2 does not answer the call, we would expect User 1 to instruct the voice application to leave a message for User 2, and to then place another call to a different user.

In the method described above, the voice application would switch User 1's audio interface 200 to a new outdialed call, and the voice application would then play a message to User 2's voice messaging system. The method could still work in this fashion, even where User 2 is a user of the system. But instead of operating in this fashion, the voice application performed on User 1's local device 210 could instead terminate the call to User 2, and then cause User 2's local device 212 to run a voice application.

The voice application running on User 1's local device 210 could cause a voice application to be performed for User 2 in multiple different ways. In some instances, the components of the voice application could be transferred from User 1's local device 210 to User 2's local device 212 via the data network. In other instances, portions of the voice application that is to be performed for User 2 could be transferred to User 2's local device, and portions could be resident on Network storage devices. In still other instances, the voice application performed on User 1's local device 210 could instruct User 2's local device 212 to obtain and perform a voice application stored on a network storage device.

Regardless of how User 2's local device is instructed to perform the voice application, there would be no need to maintain a telephone call between user 1's local device and User 2's local device once User 1 has determined that User 2 is not going to answer the call. Thus, the instant that User 1 decides to move on to a new call, the original call can be canceled and User 1 can move on to another call. Thereafter, User 2's local device can be instructed to perform the required voice application.

The voice application that User 2's local device 212 performs could simply cause an audio message to be stored on User 2's voice message system. In alternate embodiments, the voice application could wait until the next time that User 2 accesses the system, and the message could then be played live to User 2. Also, id the voice application is performed live for User 2, the voice application could be a highly interactive voice application that would allow User 2 to ask questions, and that would respond with information in response to those questions. If the voice application convinces User 2 to take a certain action, the voice application could connect User 2 with User 1, or to an alternate telemarketer, or to a customer service representative.

In still other uses of the system, instead of User 1 initially placing a telephone call to User 2, User 1 could simply instruct that a particular voice application be sent to and performed on User 2's local device 212. As noted above, this could occur in multiple different ways. But regardless, through some set of instructions, User 1 would cause User 2's local device 212 to perform a certain voice application.

As discussed above, the voice application performed to User 2 could be highly interactive, and it could result in User 2 wishing to speak with User 1. If that were the case, the voice application would cause User 2's local device to set up a telephone call to User 1. Alternatively, the voice application could connect User 2 to some other party, or the voice application could cause User 2 to take some action that is assisted by the voice application.

And rather than having User 1 individually select certain other users to receive the voice application, User 1 could instruct the voice application be performed for a group of users on a list. Also, User 1 might instruct that a voice application be performed for multiple users that all have certain defined characteristics. In this instance, the system may know details about the individual users of the system that are not known to User 1. But User 1 could still cause the system to perform a voice application for users having only certain characteristics based on the knowledge in the system. The users' privacy would not be violated because User 1 would never necessarily know to which users the voice application was ultimately performed. Thus, targeted marketing based on user characteristics is possible without divulging the users' personal information.

As an example of the above concepts, assume that User 1 is a billing agent for a cable television system. User 1 could issue an instruction to have a bill collections voice application performed for all subscribers who belong to the system and who have a bill which is overdue by more than 30 days. The system would determine the group of users who satisfy the criteria specified by User 1. And the system would then cause the local devices for each of those users to perform the bill collections voice application. In this instance, User 1 would not know the identity of the users who receive the voice application. So users' privacy would be preserved.

The bill collections voice application could be capable of informing the user of exactly how much he owes, and how far overdue his payment is. Here again, the voice application would be capable of obtaining and present information that is specific to the user, and this information would not have been divulged to User 1. The bill collections voice application could then interact with the user to allow the user to make a payment using a credit card. Alternatively, the voice application could connect the user to a live operator. All of these functions would be totally automated and they would occur as the voice application is performed for individual users.

In the description illustrated above, User 1's local device would perform a voice application, and the voice application would out dial a telephone call or cause another user's local device to perform a certain voice application. In these instances, the task of selecting who is to receive a telephone call or who is to receive a voice application could be accomplished by User 1 with User 1's computer 10, or User 1 could just make use of the local device 210 and an display screen 200A visible to User 1. In that instance, the voice application performed on the local device 210 could be capable of displaying a list of stored telephone numbers or a list of users, and the voice application would have the capability of receiving and interpreting selections made by User 1. In still other instances, User 1 might be able to select who will receive a telephone call or a voice application based upon spoken commands alone.

In the examples given above, User 1 either instructs the system to cause User 2's local device to perform a particular voice application, or User 1 first attempts to call User 2, and the instruction to perform a voice application for User 2 is only issued if User 2 does not answer the call. In still other embodiments, User 1 could place a call to User 2 and conduct an actual sales call. At the end of the sales call, User 1 could then instruct that a particular voice application be performed for User 2. Thus, a voice application could be performed for User 2 only after User 1 has conducted a call with User 2.

The voice applications performed for a called party could also operate to customize the messages which are played to the called party based on the called party's personal characteristics, which would be known by the system. Thus, a telemarketer would be able to cause a customized voice application to be performed for the called party, even through the telemarketer does not possess knowledge about the called party's personal characteristics. Here above, this would protect users' privacy, but still allow for customization of the delivered message. Customization could be as simple as playing audio recordings in different languages. Customizations of a voice application could be far more complex, and involve playing different messages to the user depending on the user's gender, age, income level or other personal characteristics.

In the embodiments described above, the local device 210 is presumed to be separate from the audio interface, as well as from a display screen and a pointing device. However, all of these elements could be incorporated into a single device. For instance, some portable computing devices available today are capable of performing all of these functions. When all of the functions are integrated into a single device, the voice application performed on the device would control the display of a list of telephone numbers, and either a pointing device or voice commands would be used to cause the various actions to take place.

Because of the distributed nature of the system, and the fact that a local device can access information stored in remote locations, lists of telephone numbers and lists of users who are to be contacted or who are to receive a voice application could be stored on the user's computer 10, on the user's local device 210 or on one or more remote data servers 500. Likewise if pre-recorded audio messages are to be played to a voice messaging system, those audio messages could also be stored on the user's computer, the user's local device, or on one or more remote data servers 500. In some embodiments, lists of telephone numbers, lists of users and the prerecorded audio messages could be stored on the same remote server, and in other instances, the data might be stored on different servers. The distributed nature of this architecture makes the remote storage and retrieval of information possible.

Figure 7:
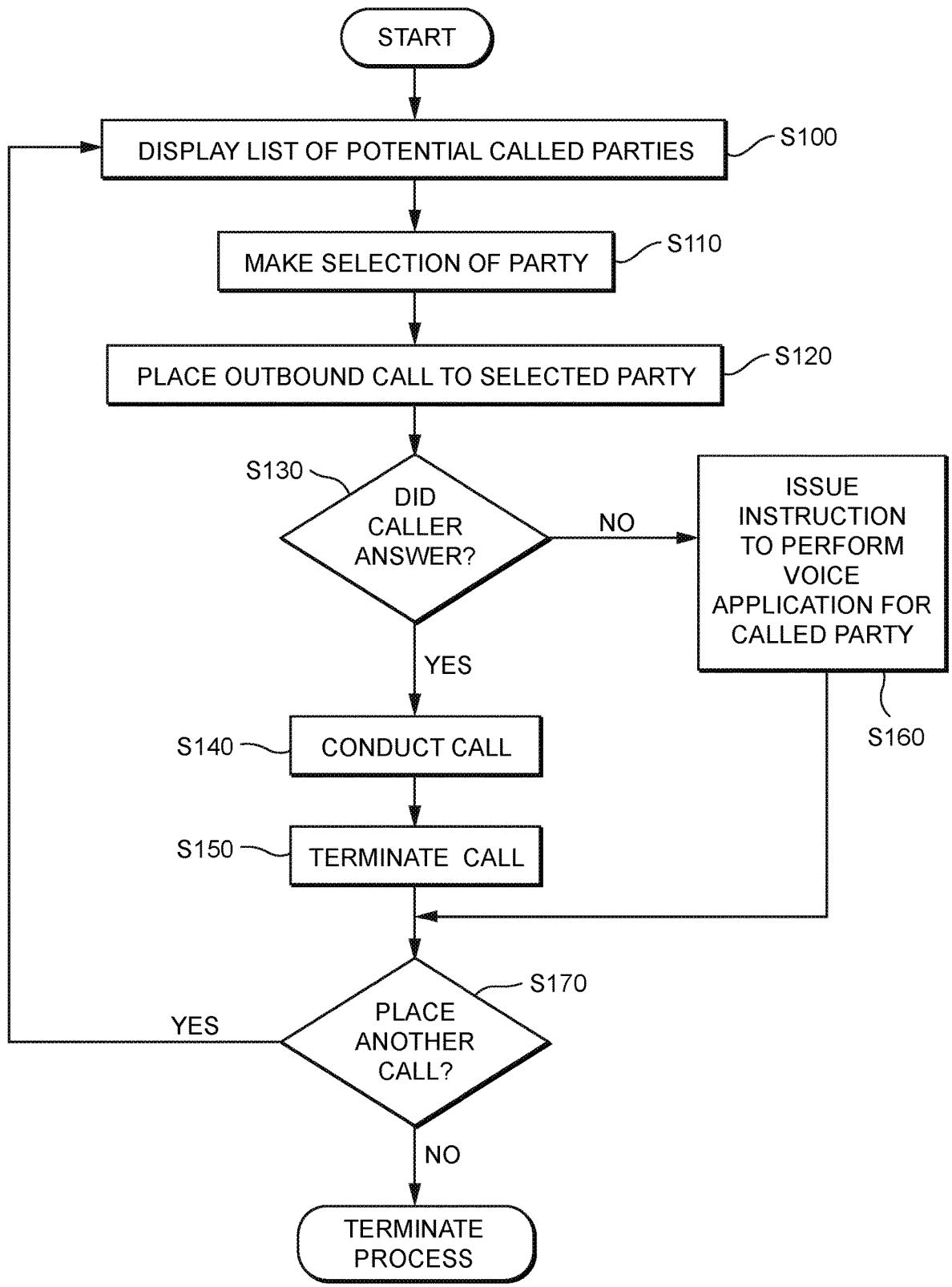
FIG. 7 is a diagram illustrating steps of a method embodying the invention.

The steps of a method embodying the invention are illustrated in FIG. 7. As shown therein, the method would start by displaying to a telemarketer a list of potential telephone numbers or users who can be called. In step S110, the telemarketer would select a party to be called, and in step S120, the voice application being performed on the telemarketer's local device would place an outbound call to selected party.

In step S130, the telemarketer would determine whether or not a live person answered the telephone call. If a live person answered the call, in step S140 the telemarketer will actually conduct the sales call with the called party. After the call has been completed, in step S150 the telephone call would be terminated.

If a live person did not answer the telephone call, the method would proceed to step S160, where the telemarketer would issue an instruction for a voice application to be performed for the called party. This voice application could be performed on the telemarketer's local device if the called party does not have the ability to perform a voice application. This would require that the telephone link be maintained between the telemarketer's local device and the called party.

In instances where the called party has the ability to perform a voice application, the telemarketer could issue an instruction that will cause the voice application to be performed on the called party's local device. And in this instance, the original telephone call could be immediately terminated, and the voice application could then be fully performed on the called party's local device.

As explained above, the voice application could ultimately be performed for the called party in multiple different ways. Regardless, at some point in time, the voice application would be performed for the called party. As also explained above, the voice application that is ultimately performed for the called party could be relatively generic, or it could be highly personalized based on various characteristics of the called party and/or the telemarketer.

In step S170, the telemarketer would then decide whether to place another call to a different called party. If no additional calls are desired, the process would terminate. If another call is desired, the method would move back to step S100 where a list of potential telephone numbers or users is displayed to the telemarketer.

In the foregoing embodiment, once the telemarketer completes a sales call with a called party, the call is terminated and there is no further involvement with the called party. In alternate embodiments, at the conclusion of the sales call, the telemarketer could instruct that a certain voice application then be performed for the called party.

Figure 8:
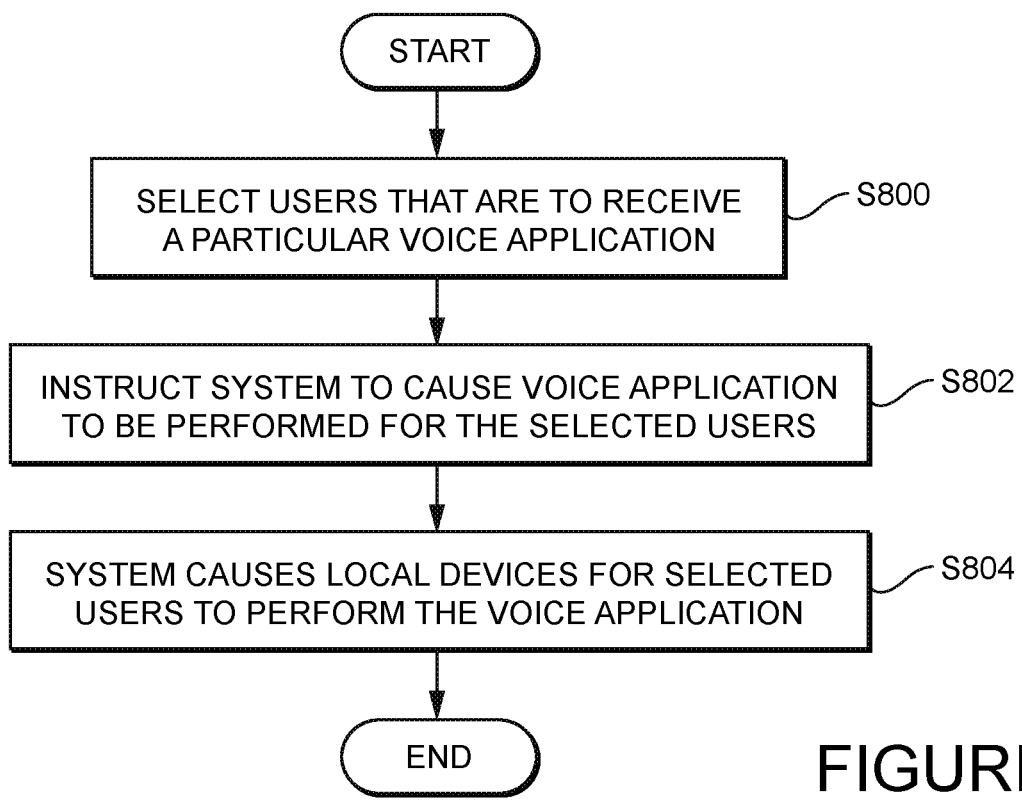
FIG. 8 is a diagram illustrating steps of another method embodying the invention.

FIG. 8 illustrated steps of an alternate method embodying the invention.

In this method, in step S800, a telemarketer or other professional could select a group of users for whom a certain voice application will be performed. This could involve making a manual selection of the users, or establishing a set of criteria that will be used to define a group of users. For instance, the professional could indicate that the voice application is to be performed for all users who are males between the ages of 18 and 30. If the professional establishes a set of criteria that will be used to determine the group, then the system would use the criteria to select the actual users.

In step S802, the professional would then instruct the system to cause the voice application to be performed for the selected group of users. In step S804, the system would then cause the local devices for the selected users to perform the voice application. This step could involve having the user's local devices proactively contacting the users and performing the voice application. In other instances, this could involve waiting for the users to interact with the system, and then performing the voice applications at that time.

When the system receives an instruction to cause a voice application to be performed on multiple user's local devices, the voice application could include the ability to establish a telephone call back to the party that originally asked for the voice application to be performed. For instance, a system manager could cause a voice application to be performed on the local devices of all users who are late in paying a bill. In this instance, the voice application could inform the user that payment is overdue, and the user may be able to interact with the voice application to make payment. Alternatively, the user might ask to speak to a customer service representative, at which point the voice application would establish a voice telephone call to a customer service representative through the user's local device.

One important point is that in order to cause voice applications to be performed on multiple users' local devices, it is not necessary to have any telephone capabilities. In the example given above, the instruction to cause an overdue billing voice application to be performed on multiple users' local devices would not require any telephone calls. And even when a user asks to be connected to a customer service representative, such a call could be established entirely through the data network, without any involvement of traditional telephone assets, and without the need for a telephone number to be associated with the customer service representative who will ultimately speak to users.

In the methods described above, it was assumed that during the process of a telemarketing call, the interaction with the called party would be primarily through an audio channel. However, interaction with the called party could also take place using a variety of additional features. For instance, a telemarketer who calls a called party on the called party's smart phone or computer might be able to provide the called party with graphical presentations in addition to spoken audio content. Likewise, if a telemarketer instructs a voice application to play a prerecorded message to a called party, that prerecorded message could be only audio, or could be a combination of audio and video data. Moreover, a voice application performed for a user might include audio, text or video. Accordingly, systems and methods embodying the invention are intended to include both those systems which communicate with a called party using only audio, and systems and methods where communications and interaction with a called party include text and graphical material.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A distributed voice application execution system (DVAES)-enabled local device for providing voice services, comprising:
    a memory;
    at least one processor;
    an operating system;
    a network interface;
    an audio and signaling layer with at least one audio I/O device interface; and
    a voice applications agent (VAA) software client configured to run on the at least one processor, the VAA software client further configured to register with a voice services provider (VSP) to have at least one credential that enables the VAA software client to communicate with one or more servers of the VSP, wherein the VAA software client is further configured to perform voice application (VA) components and/or respond to requests and/or instructions derived from VA components, and wherein the VAA software client is also configured to manage its connectivity with the at least one audio I/O device interface;
    wherein the DVAES-enabled local device includes one or more configuration materials and/or settings configured to be controlled by the VSP; and
    wherein the VAA software client is configured to:
        send, to one or more servers of the VSP, one or more messages that include information regarding an event, setting, state and/or variable associated with the DVAES-enabled local device;
        receive from one or more servers of the VSP, VA components for one or more voice applications, where the VA components are based on events, settings, states and/or variables associated with components of the DVAES-enabled local device; and
        manage performance of VA components and/or responses to requests and/or instructions derived from VA components.

2. The device of claim 1, wherein the one or more messages include information regarding an event, setting, state and/or variable associated with the VAA software client.

3. The device of claim 1, wherein the one or more messages include information regarding an event, setting, state and/or variable associated with a VA component.

4. The device of claim 1, wherein to manage performance of VA components and/or responses to requests and/or instructions derived from VA components comprises performing VA components and/or responding to requests and/or instructions derived from VA components according to established logic.

5. The device of claim 4, wherein the established logic comprises logic included in one or more VA components.

6. The device of claim 1, wherein the at least one audio I/O device interface comprises a first audio I/O device interface, and wherein to manage performance of VA components and/or responses to requests and/or instructions derived from VA components comprises controlling which of the VA components utilizes the first audio I/O device interface.

7. The device of claim 6, wherein the at least one audio I/O device interface further comprises a second audio I/O device interface that is functionally coupled to an audio device that is separate from the DVAES-enabled local device, and wherein to manage performance of VA components and/or responses to requests and/or instructions derived from VA components comprises controlling which of the VA components utilizes the second audio I/O device interface.

8. The device of claim 1, wherein the VAA software client is further configured to send update messages to one or more servers of the VSP as the VAA software client performs VA components and/or responds to requests and/or instructions derived from VA components, wherein each update message includes information regarding an event, setting, state and/or variable associated with a component of the DVAES-enabled local device.

9. The device of claim 1, wherein the VAA software client is further configured to receive at least one VA component rendered based on a capability or characteristic of the DVAES-enabled local device.

10. The device of claim 1, wherein the VAA software client is further configured to receive at least one VA component rendered based on a capability or characteristic of a data network connection of the DVAES-enabled local device.

11. The device of claim 1, wherein the VAA software client is further configured to receive at least one VA component rendered based on a characteristic of a user of the DVAES-enabled local device.

12. The device of claim 1, wherein the VAA software client is further configured to receive VA components for first and second voice applications.

13. The device of claim 12, wherein the VAA software client is configured to perform VA components for the first and second voice applications and/or respond to requests and/or instructions derived from VA components for the first and second voice applications such that the first and second voice applications are performed concurrently.

14. The device of claim 1, wherein to manage performance of VA components and/or responses to requests and/or instructions derived from VA components comprises the VAA software client:
pausing performance of VA components of a first voice application upon occurrence of a trigger event;
causing VA components of a second voice application to be performed once performance of VA components of the first voice application has been paused; and
resuming performance of the VA components of the first voice application when performance of the VA components of the second voice application is completed.

15. The device of claim 1, wherein the at least one audio I/O device interface comprises first and second audio I/O device interfaces, and wherein to manage performance of VA components and/or responses to requests and/or instructions derived from VA components comprises the VAA software client causing a first VA component to be performed via the first audio I/O device interface and causing a second VA component to be performed via the second audio I/O device interface.

16. The device of claim 1, wherein the VAA software client is further configured to detect when a user speaks a keyword or phrase by:
continuously monitoring sounds received via a microphone coupled to the at least one audio I/O device interface, and
detecting when the received sounds include the keyword or phrase; and
taking an action when the user has spoken the keyword or phrase.

17. The device of claim 16, wherein taking an action comprises:
receiving audio input after detection of the keyword or phrase; and
sending the received audio to a speech recognition interface resident on the DVAES-enabled local device or to a server of the VSP.

18. The device of claim 1, wherein the VAA software client is further configured to send to a server of the VSP a setting, state or variable of one or more configuration materials or settings of the DVAES-enabled local device.

19. The device of claim 1, wherein the VAA software client is further configured to send to a server of the VSP device log messages relating to operations of the DVAES-enabled local device.

20. The device of claim 1, wherein the DVAES-enabled local device includes configuration materials that control how the DVAES-enabled local device performs device startup procedures.

21. The device of claim 1, wherein the DVEAS-enabled local device includes configuration materials that enable the VAA software client to contact a VSP in order to register with the VSP.

22. The device of claim 1, wherein the one or more messages include values of multiple variables as of a specific time, and wherein the values of multiple variables relate to at least one of a component of the DVAES-enabled local device and performance of a VA component.

23. A non-transitory computer-readable medium bearing instructions which, when performed by one or more processors of a distributed voice application execution system (DVAES) enabled local device, cause the DVAES-enabled local device to perform a method of providing voice services, the method comprising:
sending, to one or more servers of a voice services provider (VSP), one or more messages that include information regarding an event, setting, state and/or variable associated with at least one component of the DVAES-enabled local device, wherein the DVAES-enabled local device includes a memory, at least one processor, an operating system, a network interface, an audio and signaling layer with at least one audio I/O device interface, and a voice applications agent (VAA) software client configured to run on the at least one processor, the VAA software client being configured to register with the VSP to have at least one credential that enables the VAA software client to communicate with one or more servers of the VSP, wherein the DVAES-enabled local device includes one or more configuration materials and/or settings configured to be controlled by the VSP, wherein the VAA software client is further configured to perform voice application (VA) components and/or respond to requests and/or instructions derived from VA components, and wherein the VAA software client is configured to manage its connectivity with the at least one audio I/O device interface;
receiving, at the DVAES-enabled local device from one or more servers of the VSP, VA components for one or more voice applications where the VA components are based on events, settings, states and/or variables associated with components of the DVAES-enabled local device; and
managing, with the VAA software client, performance of VA components and/or responses to requests and/or instructions derived from VA components.

24. The non-transitory computer readable medium of claim 23, wherein the one or more messages include information regarding an event, setting, state and/or variable associated with the VAA software client.

25. The non-transitory computer readable medium of claim 23, wherein the one or more messages include information regarding an event, setting, state and/or variable associated with a VA component.

26. The non-transitory computer readable medium of claim 23, wherein managing performance of VA components and/or responses to requests and/or instructions derived from VA components comprises performing VA components and/or responding to requests and/or instructions derived from a VA component according to established logic.

27. The non-transitory computer readable medium of claim 26, wherein the established logic comprises logic included in one or more VA components.

28. The non-transitory computer readable medium of claim 23, wherein the at least one audio I/O device interface comprises a first audio I/O device interface, and wherein managing performance of VA components and/or responses to requests and/or instructions derived from VA components comprises controlling which of the VA components utilizes the first audio I/O device interface.

29. The non-transitory computer readable medium of claim 28, wherein the at least one audio I/O device interface further comprises a second audio I/O device interface that is functionally coupled to an audio device that is separate from the DVAES-enabled local device, and wherein managing performance of VA components and/or responses to requests and/or instructions derived from VA components comprises controlling which of the VA components utilizes the second audio I/O device interface.

30. The non-transitory computer readable medium of claim 23, wherein the method performed by the DVAES-enabled local device further comprises sending update messages to one or more servers of the VSP as the VAA software client performs VA components and/or responds to requests and/or instructions derived from VA components, wherein each update message includes information regarding an event, setting, state and/or variable associated with a component of the DVAES-enabled local device.

31. The non-transitory computer readable medium of claim 23, wherein the receiving step comprises receiving at least one VA component rendered based on a capability or characteristic of the DVAES-enabled local device.

32. The non-transitory computer readable medium of claim 23, wherein the receiving step comprises receiving at least one VA component rendered based on a capability or characteristic of a data network connection of the DVAES-enabled local device.

33. The non-transitory computer readable medium of claim 23, wherein the receiving step comprises receiving at least one VA component rendered based on a characteristic of a user of the DVAES-enabled local device.

34. The non-transitory computer readable medium of claim 23, wherein the receiving step comprises receiving VA components for first and second voice applications.

35. The non-transitory computer readable medium of claim 34, wherein the VAA software client is configured to perform VA components for the first and second voice applications and/or respond to requests and/or instructions derived from VA components for the first and second voice applications such that the first and second voice applications are performed concurrently.

36. The non-transitory computer readable medium of claim 23, wherein managing performance of VA components and/or responses to requests and/or instructions derived from VA components comprises the VAA software client:
pausing performance of VA components of a first voice application upon occurrence of a trigger event;
causing VA components of a second voice application to be performed once performance of VA components of the first voice application has been paused; and
resuming performance of the VA components of the first voice application when performance of the VA components of the second voice application is completed.

37. The non-transitory computer readable medium of claim 23, wherein the at least one audio I/O device interface comprises first and second audio I/O device interfaces, and wherein managing performance of VA components and/or responses to requests and/or instructions derived from VA components comprises the VAA software client causing a first VA component to be performed via the first audio I/O device interface and causing a second VA component to be performed via the second audio I/O device interface.

38. The non-transitory computer readable medium of claim 23, wherein the method performed by the DVAES-enabled local device further comprises detecting when a user speaks a keyword or phrase by:
continuously monitoring sounds received via a microphone coupled to the at least one audio I/O device interface, and
detecting when the received sounds include the keyword or phrase; and
taking an action when the user has spoken the keyword or phrase.

39. The non-transitory computer readable medium of claim 38, wherein taking an action comprises:
receiving audio input after detection of the keyword or phrase; and
sending the received audio to a speech recognition interface resident on the DVAES-enabled local device or to a server of the VSP.

40. The non-transitory computer readable medium of claim 23, wherein the method performed by the DVAES-enabled local device further comprises sending to a server of the VSP a setting, state or variable of one or more configuration materials or settings of the DVAES-enabled local device.

41. The non-transitory computer readable medium of claim 23, wherein the method performed by the DVAES-enabled local device further comprises sending to a server of the VSP device log messages relating to operations of the DVAES-enabled local device.

42. The non-transitory computer readable medium of claim 23, wherein instructions on the non-transitory computer readable medium include configuration materials that control how the DVAES-enabled local device performs device startup procedures.

43. The non-transitory computer readable medium of claim 23, wherein the instructions on the non-transitory computer readable medium include configuration materials that enable the VAA software client to contact a server of the VSP in order to register with the VSP.

44. The non-transitory computer readable medium of claim 23, wherein the one or more messages include values of multiple variables as of a specific time, and wherein the values of multiple variables relate to at least one of a component of the DVAES-enabled local device and performance of a VA component.

* * * * *

UNITED STATES PATENT AND TRADEMARK OFFICE
CERTIFICATE OF CORRECTION

| | | |
|---|---|---|
| PATENT NO. | : 11,641,420 B2 | Page 1 of 1 |
| APPLICATION NO. | : 17/582479 | |
| DATED | : May 2, 2023 | |
| INVENTOR(S) | : Vishal Dhawan, Timothy M. Price and Manoj Sindhwani | |

It is certified that error appears in the above-identified patent and that said Letters Patent is hereby corrected as shown below:

On the Title Page

Item (72): Delete "Manoj Sindhwani, Oak Hill, VA (US)"

Signed and Sealed this
Sixteenth Day of July, 2024

Katherine Kelly Vidal
*Director of the United States Patent and Trademark Office*